United States Patent
Yan

(10) Patent No.: US 11,228,811 B2
(45) Date of Patent: Jan. 18, 2022

(54) VIRTUAL PROP ALLOCATION METHOD, SERVER, CLIENT, AND STORAGE MEDIUM

(71) Applicant: Tencent Technology (Shenzhen) Company Limited, Shenzhen (CN)

(72) Inventor: Yi Yan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 266 days.

(21) Appl. No.: 16/511,614

(22) Filed: Jul. 15, 2019

(65) Prior Publication Data

US 2019/0342620 A1 Nov. 7, 2019

Related U.S. Application Data

(63) Continuation of application No. PCT/CN2018/089310, filed on May 31, 2018.

(30) Foreign Application Priority Data

Jul. 18, 2017 (CN) .......................... 201710586808.6

(51) Int. Cl.
*G06F 3/00* (2006.01)
*G06F 13/00* (2006.01)
(Continued)

(52) U.S. Cl.
CPC ... *H04N 21/47205* (2013.01); *H04N 21/2187* (2013.01); *H04N 21/25841* (2013.01); *H04N 21/44016* (2013.01)

(58) Field of Classification Search
CPC ......... H04N 21/47205; H04N 21/2187; H04N 21/25841; H04N 21/44016
See application file for complete search history.

(56) References Cited

U.S. PATENT DOCUMENTS

2007/0136671 A1   6/2007  Buhrke
2008/0172173 A1*  7/2008  Chang .................... H04L 67/18
                                                                701/408
(Continued)

FOREIGN PATENT DOCUMENTS

CN    104571532 A    4/2015
CN    105450736 A    3/2016
(Continued)

OTHER PUBLICATIONS

International Search Report, issued in International Application No. PCT/CN2018/089310, dated Aug. 30, 2018, pp. 1-2, State Intellectual Property Office of the P.R. China, Beijing, China.
(Continued)

*Primary Examiner* — Kyu Chae
(74) *Attorney, Agent, or Firm* — Crowell & Moring LLP

(57) ABSTRACT

A server may divide a map into a grid comprising a plurality of cells, each of the cells corresponding to different geographic areas represented on the map. The server may determine geographic locations for a plurality of virtual props, respectively. The server may determine cells for the virtual props based on the geographic locations for placement of the virtual props. The server may obtain a current geographic location of a client. The server may identify a cell of the grid corresponding to the current geographic location of the client. The server may determine the identified cell is associated a virtual prop included in the virtual props. The server may allocate in response to the identified cell being associated with the virtual prop, the virtual prop to the client. The client receive prompt information indicative of the virtual prop being allocated to the client.

17 Claims, 12 Drawing Sheets

(51) Int. Cl.
    *H04N 5/445*      (2011.01)
    *H04N 21/472*     (2011.01)
    *H04N 21/2187*    (2011.01)
    *H04N 21/258*     (2011.01)
    *H04N 21/44*      (2011.01)

(56) References Cited

U.S. PATENT DOCUMENTS

| | | | |
|---|---|---|---|
| 2012/0064921 A1* | 3/2012 | Hernoud | H04L 41/06 |
| | | | 455/456.6 |
| 2015/0206349 A1 | 7/2015 | Rosenthal et al. | |
| 2016/0240012 A1 | 8/2016 | Gruenler et al. | |

FOREIGN PATENT DOCUMENTS

| | | |
|---|---|---|
| CN | 105654471 A | 6/2016 |
| CN | 105978888 A | 9/2016 |
| CN | 106028136 A | 10/2016 |
| CN | 106231368 A | 12/2016 |
| CN | 106844462 A | 6/2017 |
| CN | 106920079 A | 7/2017 |
| CN | 109274977 A | 1/2019 |
| EP | 1 574 240 A2 | 3/2005 |
| JP | 6-277360 | 10/1994 |
| JP | 2003-190626 A | 7/2003 |
| JP | 2003-190633 A | 7/2003 |
| JP | 2004-334649 A | 11/2004 |
| JP | 2008-73265 A | 4/2008 |
| JP | 2008-99774 A | 5/2008 |
| JP | 2009-48347 A | 3/2009 |
| JP | 2013-524344 A | 6/2013 |
| JP | 2013-172945 A | 9/2013 |
| JP | 2014-238731 A | 12/2014 |
| JP | 2016-86970 A | 5/2016 |
| WO | WO2013/042459 A1 | 3/2013 |
| WO | WO2014/171200 A | 10/2014 |
| WO | WO2016/035350 A1 | 3/2016 |
| WO | WO2017/090274 A1 | 6/2017 |
| WO | WO 2019/015405 A1 | 1/2019 |

OTHER PUBLICATIONS

Office Action for corresponding Japanese Patent Application No. 2019-543921 dated Oct. 28, 2020 and translation (10 pages).

Chinese Office Action for Chinese Patent Application 2017105868086 dated Mar. 3, 2021, including an English Concise Explanation (14 pages).

Indian Examination Report, including translation, for Application No. 201927031909 dated Mar. 5, 2021 (5 pages).

* cited by examiner

VIRTUAL PROP ALLOCATION METHOD, SERVER, CLIENT, AND STORAGE MEDIUM

CROSS REFERENCE TO RELATED APPLICATIONS

This application is a continuation of International Application PCT/CN2018/089310, filed May 31, 2018, entitled VIRTUAL PROP ALLOCATION METHOD, SERVER, CLIENT AND STORAGE MEDIUM, which claims priority to Chinese Patent Application No. 201710586808.6, filed on Jul. 18, 2017, both of which are incorporated herein by reference in their entireties.

TECHNICAL FIELD

This application relates to the field of data processing technologies, and specifically, to a virtual prop allocation method, a server, a client, and a storage medium.

BACKGROUND

With development of live streaming, personal live streaming accounts for an increasingly high proportion of live streaming. Personal live streaming is may include performing interaction between a streamer and a viewer in a form of video by using a live streaming platform. The streamer may broadcast a video and/or image to the viewer through the live streaming platform.

SUMMARY

The present disclosure provides various aspects of a virtual prop allocation method, a server, a client, a storage medium, and/or system. In a first example aspect, a method may include dividing, by a server, a map into a grid comprising a plurality of cells, each of the cells corresponding to different geographic areas represented on the map. The method may further include determining, by the server, geographic locations for a plurality of virtual props, respectively. The method may further include determining, by the server, cells for the virtual props based on the geographic locations for placement of the virtual props. The method may further include obtaining, by the server, a current geographic location of a client. The method may further include identifying, by the server, a cell of the grid corresponding to the current geographic location of the client. The method may further include determining, by the server, the identified cell is associated a virtual prop included in the virtual props. The method may further include allocating, by the server, in response to the identified cell being associated with the virtual prop, the virtual prop to the client.

In a second example aspect, a method may include reporting, by a client, a geographic location identifier to a server, the geographic location identifier corresponding to a current geographic location of a client. The method may further include receiving, by the client, in response to determination, by the server, that a virtual prop is associated with a cell corresponding to the current geographic location of the client in a map, prompt information indicative of the virtual prop being allocated to the client, wherein the map is divided into a grid comprising a plurality of cells, each of the cells being associated with corresponding geographic area and a geographic location for placement of at least one of a plurality of virtual props.

A third example aspect may include a server. The server may include a processor and/or a memory, such as non-transitory storage medium. The server may divide a map into a grid comprising a plurality of cells, each of the cells corresponding to different geographic areas represented on the map. The server may determine geographic locations for a plurality of virtual props, respectively. The server may determine cells for the virtual props based on the geographic locations for placement of the virtual props. The server may obtain a current geographic location of a client. The server may identify a cell of the grid corresponding to the current geographic location of the client. The server may determine the identified cell is associated a virtual prop included in the virtual props. The server may allocate in response to the identified cell being associated with the virtual prop, the virtual prop to the client.

A fourth example aspect may include a client. The client may include a processor and/or a memory, such as non-transitory storage medium. The client may report a geographic location identifier to a server, the geographic location identifier corresponding to a current geographic location of a client. The client receive in response to determination, by the server, that a virtual prop is associated with a cell corresponding to the current geographic location of the client in a map, prompt information indicative of the virtual prop is allocated to the client, wherein the map is divided into a grid comprising a plurality of cells, each of the cells being associated with corresponding geographic area and a geographic location for placement of at least one of a plurality of virtual props.

In various embodiments, the aforementioned example aspects, or portions thereof, may be combined in a system for virtual prop allocation. Additional alternative aspects, examples, embodiments, and/or technical advancements are described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A virtual prop may be included in a computer-augmented environment to improve interaction between a streamer and a viewer is a means by which a live streaming platform retains the viewer. For example, in a streamer video image, a virtual prop, such as a virtual headwear, a virtual facial pendant, and/or some other virtual image object, is superimposed and put on the streamer to improve vividness of the streamer video image, thus intensifying an interaction effect between the streamer and the viewer. A virtual prop may include a virtual object that may be moved in a computer augment environment. For example, the virtual proper may include an image data for an object. The virtual prop may be super imposed on image data corresponding to a real physical environment or person. In some examples, the virtual prop may represent a physical object that is attachable or wearable, such as a hat, a watch, glasses, or other objects.

In live streaming, a virtual prop allocation manner is mainly providing a virtual prop list in advance, and selecting, by a streamer or a viewer, a virtual prop from the virtual prop list, to implement virtual prop allocation. Such a manner of providing a virtual prop list in advance to perform virtual prop allocation is relatively monotonous, and a streamer or a viewer in a virtual prop allocation process only performs an operation of selecting a virtual prop, sense of reality of experience is relatively poor.

Therefore, how to provide a novel virtual prop allocation manner, to enrich virtual prop allocation manners and improve sense of reality of experience of a streamer or viewer in a virtual prop allocation process, becomes a technical problem.

Figure 1:
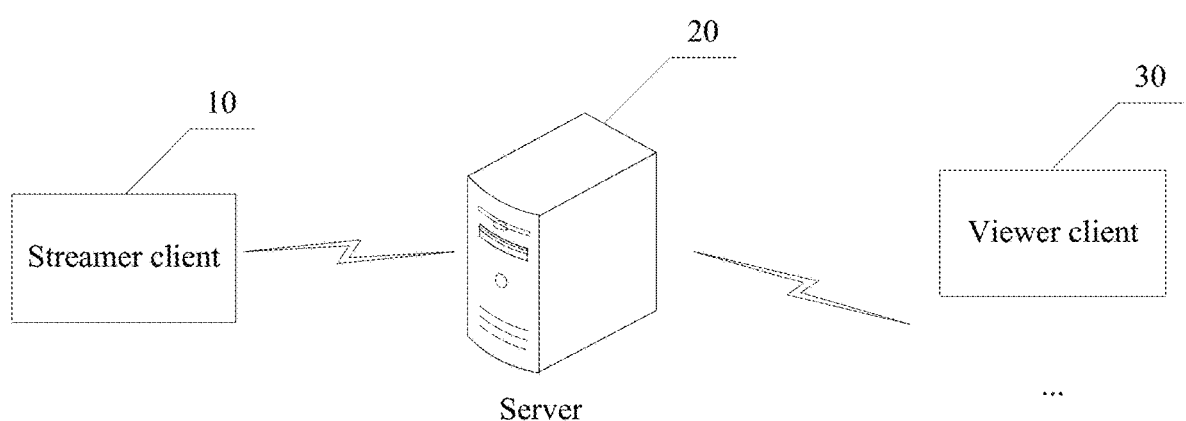
FIG. 1 is a block diagram of a system architecture according to an embodiment of this application.

FIG. 1 is a block diagram of a system architecture for implementing a virtual prop allocation method according to an embodiment of this application. Referring to FIG. 1, the system may include: a streamer client 10, a server 20, and a view client 30.

The streamer client 10 may be considered as a client used by a streamer for performing live streaming, and the viewer client 30 may be considered as a client used by a viewer for viewing live streaming.

A streamer is a provider of a live video. A streamer client is a client used by a streamer for recording a live video. Before performing live streaming, a streamer logs in to a streamer client by using an existing streamer account and a password, and after the streamer logs in to the streamer client, the streamer client can capture a streamer video image through an image capturing apparatus such as a camera, and send the captured streamer video image to a server in real time.

A streamer video image is an image or video (such as live video), including a streamer portrait, captured by a streamer client through an image capturing apparatus. For example, when a streamer is performing live streaming at a streamer client, a front camera of the streamer client may be used to capture a streamer portrait inside a lens range of the camera to obtain a streamer video image. In other words, the streamer portrait may include image data representative of a person generating the live stream. The image data of the streamer portrait may be included in a portion of a still image and/or a portion of a frame of a video stream.

A viewer is a view of a live video. A viewer client is a client used by a viewer for viewing a live video recorded by a streamer. Before viewing a live video, a viewer logs in to a viewer client by using an existing viewer account and a password, and after logging in to the viewer client, the viewer can view, by using the viewer client, a live video delivered by a server.

The server 20 may be considered as a serving device including at least a live streaming server. The server 20 may further integrate an Augmented Reality (AR) processing capability and a Location Based Service (LBS) serving capability.

Optionally, the server 20 may be implemented by a single server, and the server 20 may integrated a live streaming capability, an AR processing capability, an LBS serving capability, and the like. Optionally, the server 20 may alternatively be implemented by a server cluster including a plurality of servers, for example, a server cluster including a live streaming server, an AR server, and an LBS server. In this case, processing procedures of the live streaming server, the AR server, and the LBS server all may be considered to be executed by the server 20.

When performing live streaming, the streamer client may send a captured streamer video image to the server, and after processing the streamer video image, the server may broadcast the processed streamer video image to the viewer client.

Different from the existing virtual prop allocation manner of selecting a virtual prop based on a virtual prop list, in this embodiment of this application, to implement virtual prop allocation, the server 20 may determine a geographic location for placement of each virtual prop, so as to allocate, based on the LBS and according to a geographic location change of the streamer or the viewer, a virtual prop to a streamer or a viewer whose geographic location corresponds to the geographic location for placement of the virtual prop, thereby implementing allocation of the virtual prop.

In this embodiment of this application, a virtual prop may be allocated to a streamer, and the virtual prop allocated to the streamer may be superimposed onto a real streamer video image, thereby synthesizing a streamer video image with the virtual prop, and combining the virtual prop with the real streamer video image.

Optionally, this embodiment of this application, a virtual prop may alternatively be allocated to a viewer, and the virtual prop allocated to the viewer may be associated with a streamer viewed by the viewer, so that the streamer obtains the virtual prop allocated to the viewer. The virtual prop allocated to the viewer may alternatively be held by the viewer, and may allow the viewer to present the allocated virtual prop to a streamer.

Figure 2:
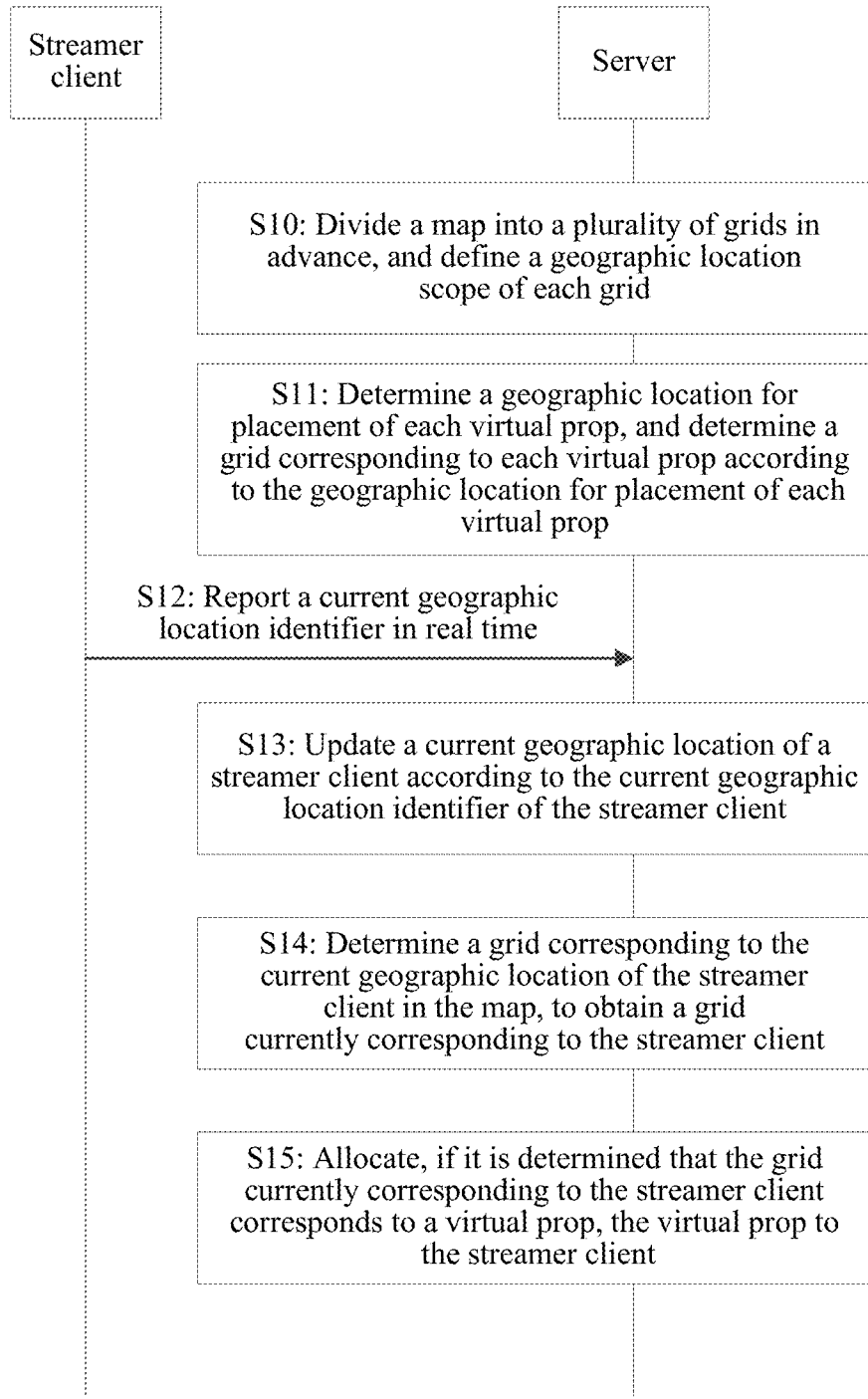
FIG. 2 is a signaling flowchart of a virtual prop allocation method according to an embodiment of this application.

The virtual prop allocation method is described by using a case in which a virtual prop is allocated to a streamer. FIG. 2 shows a signaling flowchart of an optional virtual prop allocation method. With reference to FIG. 1 and FIG. 2, the procedure may include the following steps.

Step S10: A server divides a map into a grid comprising a plurality of cells in advance, and defines a geographic location scope of each cell. Each of the cells may correspond to different geographic areas represented on the map;

In this embodiment of this application, when virtual prop allocation is implemented, a map may be divided into a plurality of cells in advance, and a geographic location scope of each cell divided from the map may be defined. Optionally, step S10 may be performed only once in a plurality of times of virtual prop allocation, and the plurality of times of virtual prop allocation may all be performed based on a predetermined geographic location scope of each cell.

Optionally, the map may be a graphic result of drawing scaled-down surveyed street graphics at a specific ratio. In this embodiment of this application, a size of the cell may be specified, and the map is divided into a plurality of cells according to the specified size of the cell, so that a size of each cell in the map corresponds to the specified size of the cell.

Figure 3:
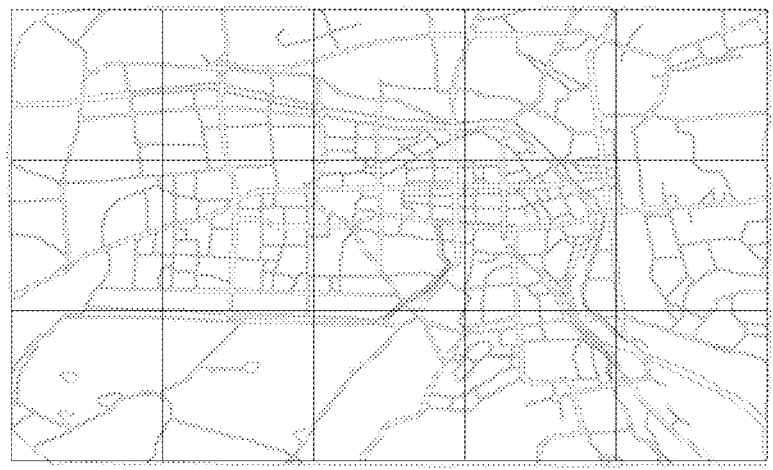
FIG. 3 is a schematic diagram of a map divided into grids.

Using a square cell as an example, after a side length of the square cell is specified, as shown in FIG. 3, in this embodiment of this application, the map may be divided into a plurality of square cells, and a side length of each square cell corresponds to the specified side length of the square cell.

Step S11: The server determines a geographic location for placement of each virtual prop, and determines a cell corresponding to each virtual prop according to the geographic location for placement of each virtual prop.

When virtual prop allocation is performed, in this embodiment of this application, each virtual prop that can be allocated may be determined, and a geographic location for placement of each virtual prop is determined (optionally, a geographic location for placement of each virtual prop may be randomly defined, or a geographic location for placement of each virtual prop may be defined according to a population distribution density, and generally, more virtual props are allocated to a geographic location corresponding to an area having a higher population distribution density). Optionally, the server may randomly determine a virtual prop that can be allocated, or may determine a virtual prop that can be allocated currently in a virtual prop library according to a predetermined virtual prop selection policy, where the virtual prop library may be a database storing virtual props set by the server.

It should be noted that determining a geographic location for placement of each virtual prop and placing the virtual prop is not placing the prop at a real geographic location. Based on a property of a virtual prop, the determining a geographic location for placement of each virtual prop and placing the virtual prop indicated in this embodiment of this application may be considered as virtual placement of the virtual prop, and is essentially a correspondence and association between a virtual prop and a determined geographic location for placement in terms of data.

Figure 4:
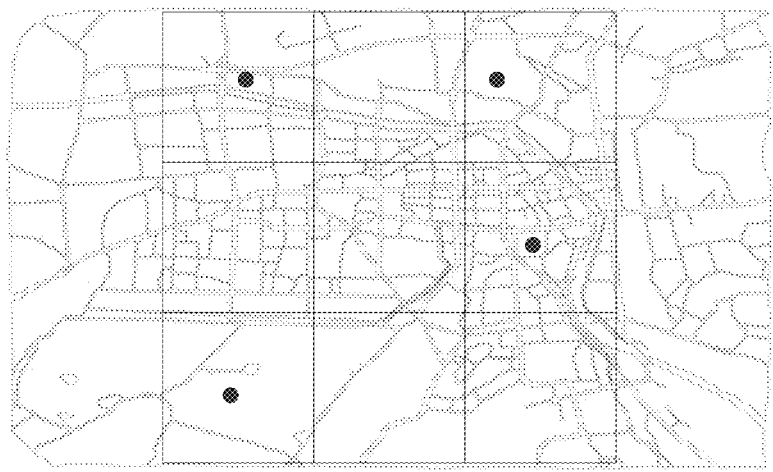
FIG. 4 is a schematic diagram of indicating a grid corresponding to a virtual prop in a map.

After the geographic location for placement of each virtual prop is determined, in this embodiment of this application, a grid and/or cell corresponding to a geographic location scope in which a geographic location for placement of each virtual prop is located may be determined according to the geographic location for placement of each virtual prop and the geographic location scope of each grid and/or cell, and a cell corresponding to each virtual prop may be determined. As shown in FIG. 4, a cell corresponding to each virtual prop may be determined according to a geographic location for placement of a virtual prop and a geographic location scope of each cell, one cell may correspond to at least one virtual prop, and a black dot in FIG. 4 represents a virtual prop.

Step S12: A streamer client reports a current geographic location identifier of the streamer client to the server in real time.

Further, after the server determines the geographic location for placement of each virtual prop, the server may send virtual prop placement prompt information to the streamer client.

If a streamer has a need of obtaining a virtual prop, the streamer may send, to the server through a streamer client, request information for requesting for virtual prop allocation, and the streamer client needs to report a current geographic location identifier of the streamer client to the server in real time. Optionally, the geographic location identifier may include, but is not limited to, any one of the following: a wifiMac address (an physical MAC address of WIFI), a cellID (a base station of an operator), and a longitude and latitude obtained through positioning (such as GPS positioning).

Optionally, in this embodiment of this application, it is not necessary that only after the server sends virtual prop placement prompt information to the streamer client, the streamer client sends, to the server, request information for requesting virtual prop allocation. The streamer client may alternatively send request information for requesting for virtual prop allocation to the server through the streamer client whenever the streamer considers that there is a need for obtaining a virtual prop. In this case, if there is a virtual prop for placement currently, a subsequent procedure is performed, if there is no virtual prop for placement currently, a prompt indicating that no virtual prop is placed yet is sent to the streamer client, and the procedure is ended.

Further, in this embodiment of this application, alternatively, the server performs step S11 of placing a virtual prop based on request information for requesting for virtual prop allocation sent by the streamer client.

Optionally, the streamer client indicated in step S12 may be a streamer client that requests the server for virtual prop allocation.

Step S13: The server updates a current geographic location of the streamer client according to the current geographic location identifier of the streamer client.

Optionally, the server updates, based on the LBS service, the current geographic location of the streamer client according to the current geographic location identifier of the streamer client.

If the geographic location identifier is a longitude and latitude obtained by positioning the streamer client, the longitude and latitude may be directly used as a geographic location of the streamer client.

Moreover, if the geographic location identifier is information, such as a wifiMac address or a cellID, that cannot directly represent a geographic location, the server may record a correspondence between the geographic location identifier and the geographic location, and update the current geographic location of the streamer client according to a geographic location identifier reported by the streamer client in real time and the correspondence.

In an example in which the geographic location identifier is a wifiMac address, in this embodiment of this application, wifiMac addresses and longitudes and latitudes reported by a large quantity of users are collected through a social platform (such as an instant messaging platform), correspondences between the wifiMac addresses and the longitudes and latitudes are analyzed, to obtain correspondences between geographic location identifiers and geographic locations, and further, a current longitude and latitude (that is, a geographic location) of the the streamer client can be updated in real time according to a wifiMac address reported by the streamer client in real time and a correspondence between the wifiMac address and the longitude and latitude.

Optionally, a longitude and latitude is merely an optional representation form of a geographic location. This embodiment of this application does not exclude another geographic location representation form.

Optionally, step S12 to step S13 may be considered as an optional manner in which the server obtains the current geographic location of the streamer client.

Step S14: The server determines a grid corresponding to the current geographic location of the streamer client in the map, to obtain a grid currently corresponding to the streamer client.

In this embodiment of this application, a cell corresponding to a geographic location scope in which the current geographic location of the streamer client is located is determined according to the current geographic location of the streamer client and the geographic location scope of each cell, and a cell currently corresponding to the streamer client is determined.

Step S15: The server allocates, if determining that the cell currently corresponding to the streamer client corresponds to a virtual prop, the virtual prop to the streamer client.

Further, the server may send, to the streamer client, prompt information indicating that the virtual prop is allocated to the streamer client.

In the virtual prop allocation method provided in this embodiment of this application, the server may divide a map into a grid comprising a plurality of cells in advance, and define a geographic location scope of each. Therefore, when virtual prop allocation is performed, a geographic location for placement of each virtual prop may be determined, and a cell corresponding to each virtual prop is determined according to the geographic location for placement of each virtual prop. Further, the server may obtain a current geographic location of the streamer client, and determine a cell corresponding to the current geographic location of the streamer client in the map, to obtain a cell currently corresponding to the streamer client. The server allocates, if determining that the cell currently corresponding to the streamer client corresponds to a virtual prop, the virtual prop to the streamer client to complete allocation of the virtual prop.

In view of the above, in the novel virtual prop allocation method provided in this embodiment of this application, virtual prop allocation may be implemented based on matching between a cell corresponding to a geographic location for placement of virtual prop in a map and a cell corresponding to a current geographic location of the streamer client in the map. In addition, in a process of searching for a virtual prop, the streamer needs to make the cell corresponding to the streamer client correspond to the cell corresponding to the virtual prop by changing a location, thereby improving sense of reality of experience of the streamer in a virtual prop allocation process.

Optionally, a virtual prop allocated to the streamer and a geographic location for placement of the virtual prop may alternatively be determined by the viewer. The viewer may buy a virtual prop and present it to the streamer. Different from an existing manner in which a viewer buys a virtual prop and then, directly presents it to a streamer, in this embodiment of this application, after buying a virtual prop, a viewer indicates a geographic location for placement of the virtual prop (further, a streamer to which the virtual prop is presented may also be indicated), and only when a streamer moves to a grid and/or cell corresponding to the virtual prop, the streamer can obtain the virtual prop.

Correspondingly, the viewer may buy a virtual prop through a viewer client and indicate a geographic location for placement of the virtual prop (further, a streamer to which the virtual prop is presented may also be indicated). Further, the viewer client may send a virtual prop placement request to the server. The virtual prop placement request indicates a to-be-placed virtual prop and a geographic location for placement. After obtaining the virtual prop placement request sent by the viewer client, the server may determine a geographic location for placement of the to-be-placed virtual prop according to the virtual prop placement request, thereby determining the geographic location for placement of the virtual prop.

Further, if the viewer client indicates a streamer to which the virtual prop is presented, in step S15, when determining that the grid and/or cell currently corresponding to the streamer client corresponds to a virtual prop, the server may further determine whether a streamer corresponding to the streamer client corresponds to the streamer to which the virtual prop is presented as indicated by the viewer client, so that when determining that the grid and/or cell currently corresponding to the the streamer client corresponds to a virtual prop, and the streamer corresponding to the streamer client corresponds to the streamer to which the virtual prop is presented as indicated by the viewer client, the server allocates the virtual prop to the streamer client.

Optionally, in this embodiment of this application, an effective placement time may further be set for each virtual prop, and only in an effective placement time of a virtual prop, the streamer client can obtain the virtual prop by moving to a grid and/or cell corresponding to the virtual prop. Moreover, if there is a virtual prop whose elapsed time for placement reaches an effective placement time, and has not been allocated to a client, a relationship between the virtual prop and a corresponding grid and/or cell needs to be canceled, so that the virtual prop cannot be allocated to the client any more. That is, the relationship between the virtual prop and the corresponding grid/or cell is canceled, so that the virtual prop cannot be allocated when subsequently, there is a client that arrives at the grid and/or cell originally corresponding to virtual prop.

Optionally, to improve convenience for a streamer to search for a virtual prop, and further improve sense of reality of experience of the streamer in a virtual prop allocation process, the server may determine, according to a grid and/or cell currently corresponding to the streamer client and a grid and/or cell corresponding to each virtual prop, location prompt information of each virtual prop relative to the streamer client, and feed back the location prompt information to the streamer client, to facilitate the streamer client of performing presentation, so that the streamer may search for the virtual prop based on the location prompt information presented by the streamer client.

Figure 5:
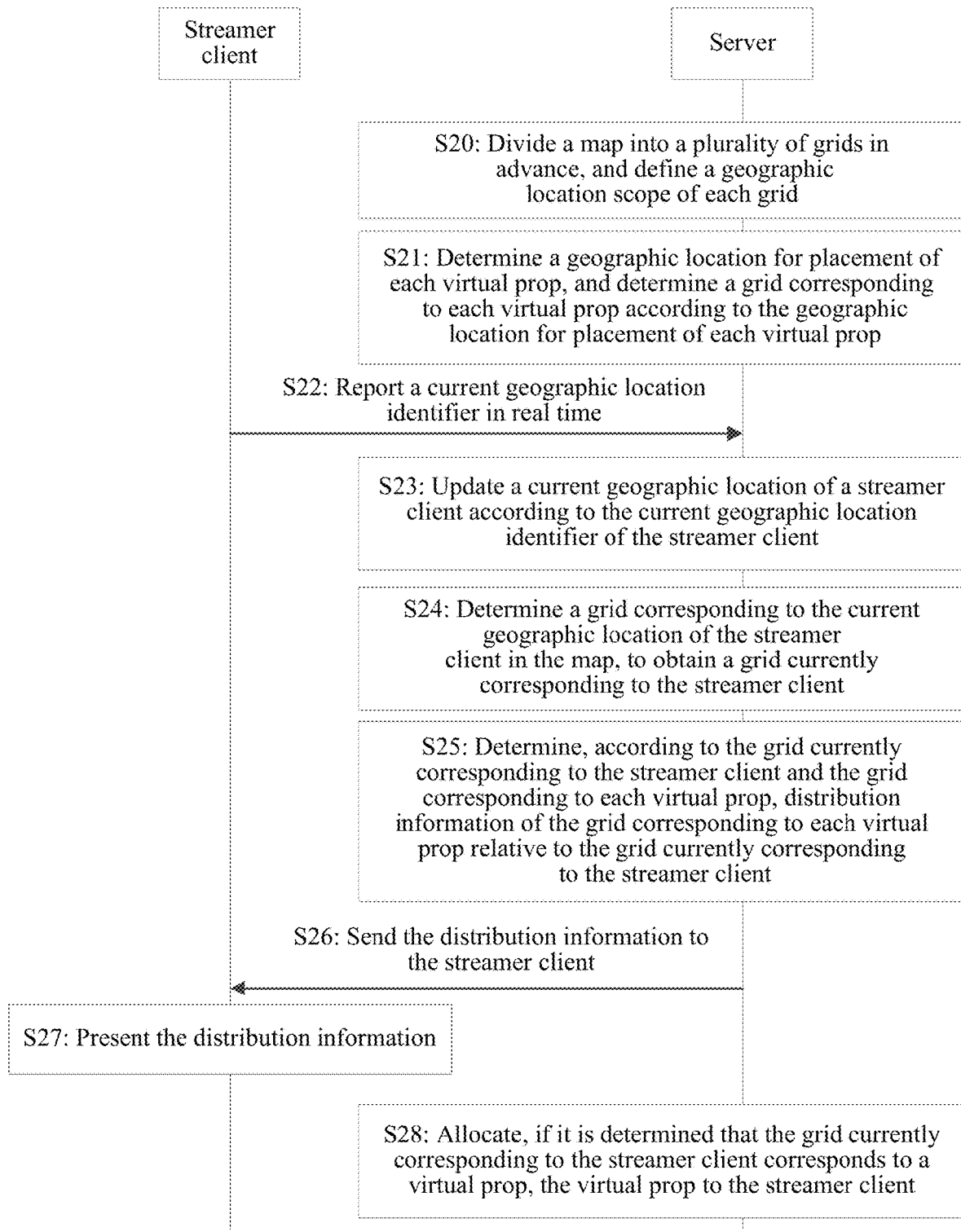
FIG. 5 is another signaling flowchart of a virtual prop allocation method according to an embodiment of this application.

Optionally, FIG. 5 shows another signaling procedure of a virtual prop allocation method. Referring to FIG. 5, the procedure may include:

Step S20: A server divides a map into a grid comprising a plurality of cells in advance, and defines a geographic location scope of each cell.

Step S21: The server determines a geographic location for placement of each virtual prop, and determines a cell corresponding to each virtual prop according to the geographic location for placement of each virtual prop.

Step S22: A streamer client reports a current geographic location identifier of the streamer client to the server in real time.

Step S23: The server updates the current geographic location of the streamer client according to the streamer client current geographic location identifier.

Step S24: The server determines a cell corresponding to the current geographic location of the streamer client in the map, to obtain a cell currently corresponding to the streamer client.

Step S25: The server determines, according to the cell currently corresponding to the streamer client and the cell corresponding to each virtual prop, distribution information of the cell corresponding to each virtual prop relative to the cell currently corresponding to the streamer client.

The server may determine, according to the cell currently corresponding to the streamer client and the cell corresponding to each virtual prop, distribution information of the cell corresponding to each virtual prop relative to the cell currently corresponding to the streamer client. The distribution information may represent a location of the virtual prop relative to the streamer client.

Optionally, the distribution information may be superimposed onto the map in a graphic form. For example, a traversing scope of cells is gradually enlarged by using the cell currently corresponding to the client in the map as a center until cells of a specified scope are all traversed, and the traversed cells each corresponding to a virtual prop are marked to determine the distribution information. The cells of the specified scope may alternatively be defined in advance and may be cells in a specific scope with the cell currently corresponding to the client as a center. Optionally, the cells of the specified scope may be all cells.

Figure 6:
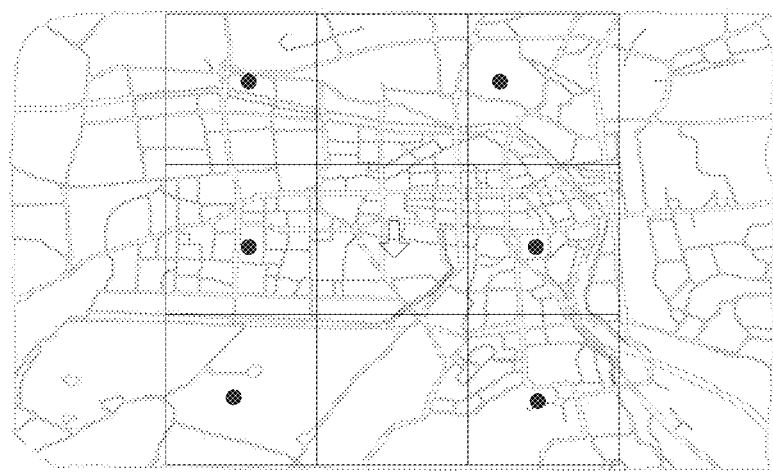
FIG. 6 is a schematic diagram of distribution information of a virtual prop relative to a streamer.

As shown in FIG. 6, the server may first traverse cells surrounding the cell currently corresponding to the streamer client with the cell currently corresponding to the streamer client as a center in the map, and then traverse cells surrounding each traversed cell until cells of a specified scope criteria are all traversed, thereby marking the traversed cells each corresponding to a virtual prop to determine the distribution information. The specific scope criteria may conclude a # of cells in a grid and/or a proximity, such as a distance, to a cell corresponding to a client. In FIG. 6, an arrow indicates a location of a streamer.

Optionally, step S25 shown in FIG. 5 is merely an optional manner in which the server determines, according to the cell currently corresponding to the streamer client and the cell corresponding to each virtual prop, location prompt information of each virtual prop relative to the streamer client. That is, the distribution information is merely an optional form of the location prompt information. In addition to that the distribution information shown in step S25 is used as the location prompt information, in this embodiment of this application, a distance and a direction of each virtual prop relative to the streamer client may be determined according to the cell currently corresponding to the streamer client and the cell corresponding to each virtual prop, and the distance and the direction of each virtual prop relative to the streamer client are used as the location prompt information.

Figure 7:
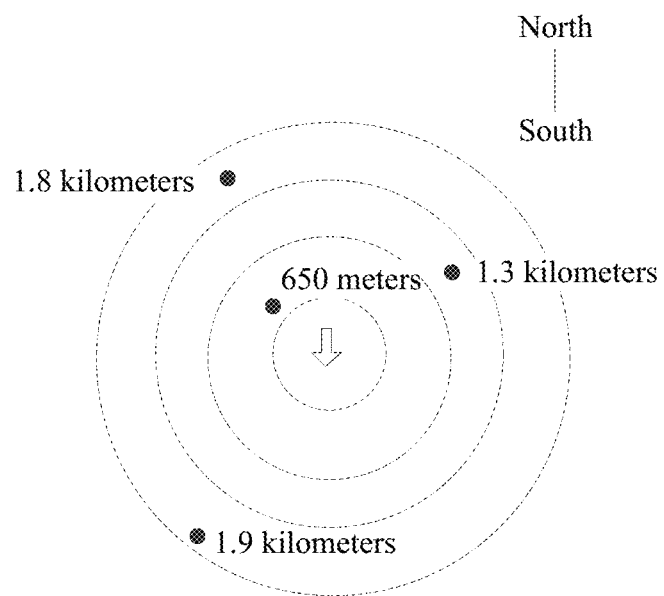
FIG. 7 is a schematic diagram of representing a distance and a direction of a virtual prop relative to a streamer in a radar map.

Optionally, another presentation form of the location prompt information may be a radar map. In this embodiment of this application, a radar map may be drawn according to the cell currently corresponding to the streamer client and the cell corresponding to each virtual prop, and a distance and a direction of the cell corresponding to each virtual prop relative to the cell currently corresponding to the streamer client are marked in the radar map (for example, a distance and a direction of a central geographic location of a cell corresponding to a virtual prop relative to a central geographic location of the cell currently corresponding to the streamer client). An optional form of the radar map is as shown in FIG. 7. In FIG. 7, an arrow represents a current location of a streamer, and a black dot represents a nearest virtual prop.

Step S26: The server sends the distribution information to the streamer client.

The distribution information may represent a location of the virtual prop relative to the streamer client. The server may send the distribution information to the streamer client, to facilitate the streamer client of presenting the distribution information and facilitate the streamer client of searching for the placed virtual prop.

Optionally, step S26 is merely an optional manner in which the server sends the location prompt information to the streamer client.

Step S27: The streamer client presents the distribution information.

Optionally, step S27 is merely an optional manner in which the streamer client presents the location prompt information Step S28: The server allocates, if determining that the cell currently corresponding to the streamer client corresponds to a virtual prop, the virtual prop to the streamer client.

In view of the above, in the procedure shown in FIG. 5, the streamer may search for the virtual prop based on the location prompt information of each virtual prop relative to the streamer client sent by the server, thereby improving sense of reality of experience of the streamer in a virtual prop allocation process.

After the server allocates a virtual prop to the streamer client, the streamer client may receive prompt information for obtaining the virtual prop. If the streamer client uses the virtual prop based on an instruction of the streamer, the server may superimpose an image of the virtual prop onto a streamer video image captured by the streamer client (for example, the virtual prop is a wearable virtual headwear, facial pendant, or body pendant, or the like, a virtual background that can be used as an image background, or the like), to obtain a target video image combining virtuality and reality after the streamer video image and the image of the virtual prop are combined, thereby improving vividness of a video image during live streaming.

Figure 8:
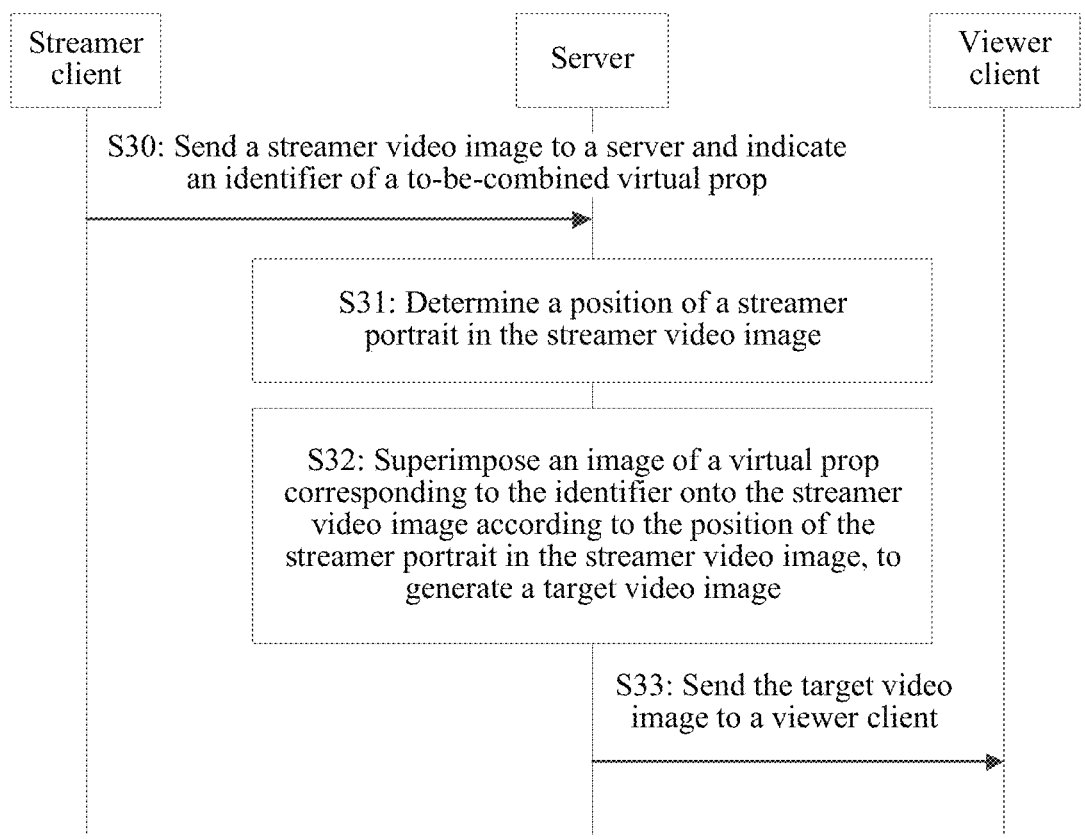
FIG. 8 is a signaling flowchart of live streaming according to an embodiment of this application.

Optionally, based on the procedure shown in FIG. 2, after the streamer client uses the allocated virtual prop, live streaming may be implemented by using the method shown in FIG. 8. FIG. 8 shows a signaling procedure of live streaming according to an embodiment of this application. With reference to FIG. 1 and FIG. 8, the procedure may include the following steps.

Step S30: A streamer client sends a streamer video image to a server and indicates an identifier of a to-be-combined virtual prop.

The streamer client may capture a streamer video image through an image capturing apparatus such as a camera, and send the streamer video image to the server. In a process of performing live streaming, the streamer client may send each captured frame of streamer video image to the server in real time.

Optionally, the image capturing apparatus for capturing the streamer video image may be a built-in camera of a terminal device (for example, a mobile phone on which the streamer client is installed) corresponding to the streamer client. To achieve a better image capturing effect, a streamer video image may alternatively be captured by using an AR camera (for example, an AR camera having a 360-degree panoramic photographing capability) connected to the terminal device corresponding to the streamer client.

When the streamer client obtains the allocated virtual prop, if the streamer is equipped with the virtual prop (that is, the image of the virtual prop needs to be combined onto the captured streamer video image), the streamer client may send the identifier of the to-be-combined virtual prop to the server. It may be understood that obtaining, by the streamer client, the allocated virtual prop may be considered to be that the streamer client is associated with the identifier of the virtual prop, and has a use permission of the virtual prop.

Step S31: The server determines a position of a streamer portrait in the streamer video image.

Because the streamer is usually stationary in a live streaming process, to achieve alignment during superimposition of the image of the virtual prop on the streamer video image, in this embodiment of this application, a position of the streamer portrait in each frame of streamer video image may be determined by using an edge detection technology and a motion detection technology.

For example, edge detection may be performed on a streamer portrait in each frame of streamer video image according to the edge detection technology, to obtain an edge position of the streamer portrait in each frame of streamer video image. Each frame of streamer video image is processed according to the motion detection technology, to determine a body position of the streamer portrait in each frame of streamer video image. Therefore, a position of the streamer portrait in each frame of streamer video image is determined with reference to the edge position and the body position of the streamer portrait in each frame of streamer video image.

It should be noted herein that in this embodiment of this application, the edge detection technology is used to increase accuracy of aligning the real streamer video image with the image of the virtual prop, and if an edge in an image is considered as a place where brightness of a quantity of pixels changes, the edge detection technology may be considered to be calculating a derivative of a brightness change of the quantity of pixels. Further, because the streamer is unlikely to be stationary, the motion detection technology is involved to capture a motion of the streamer, thereby guaranteeing coherence of streamer images after the streamer video image and the image of the virtual prop are combined, and reducing a case in which a loading speed of the image of the virtual prop does not match a loading speed of the real streamer video image.

For the principle of the motion detection technology, refer to a facial tracking technology. A model-based tracking method, such as the facial tracking technology, may be used. First, a facial model of the streamer may be determined by using a facial recognition technology, and facial model matching is performed on each input frame of streamer video image by using a sliding window, to output facial registration coordinates of features of the facial model in each frame of image. Correspondingly, the motion detection technology relates to detection on human body features (such as a hand, a palm of a hand, a leg, etc.) represented in a portrait, a principle thereof is similar to that of the facial tracking technology, and a difference is that a feature model (including the facial model) representing each body feature of the streamer is set. For example, motion detection technology involves the detection of human bodies Step S32: The server superimposes an image of a virtual prop corresponding to the identifier onto the streamer video image according to the position of the streamer portrait in the streamer video image, to generate a target video image.

Step S32 may be considered as rendering the image of the virtual prop in the streamer video image. After obtaining an identifier, sent by the streamer client, of a virtual prop to be superimposed onto the streamer video image, the server may invoke a corresponding image of the virtual prop according to the identifier, so as to superimpose the image of the virtual prop corresponding to the identifier onto the streamer video image according to a position of the streamer portrait in the streamer video image, so that the virtual prop is rendered in the streamer video image, and a target video image combining the image of the virtual prop and the streamer video image is generated.

Optionally, a manner of superimposing an image of a virtual prop onto the streamer video image according to the position of the streamer portrait in the streamer video image may be adjusted according to a type of the virtual prop. If the virtual prop is a wearable virtual prop of the streamer portrait, the image of the virtual prop is superimposed at a position of a target part of the streamer portrait in each frame of streamer video image. The target part may be considered as a specified part for wearing a virtual prop. If the virtual prop is glasses, the target part is eyes.

If the virtual prop is a virtual background, a background position in each frame of streamer video image may be determined according to a position of the streamer portrait in each frame of streamer video image, and the virtual prop is superimposed at the background position in each frame of streamer video image.

Step 31 may alternatively be determining, by the server, a position of a moving target, other than the streamer portrait in the streamer video image, in the streamer video image. Correspondingly, step 32 may be superimposing, by the server according to the position of the moving target in the streamer video image, the image of the virtual prop corresponding to the identifier onto the streamer video image, to generate the target video image.

Specifically, after obtaining an identifier, sent by the streamer client, of a virtual prop to be superimposed onto the streamer video image, the server may invoke a corresponding image of the virtual prop according to the identifier, so as to superimpose the image of the virtual prop corresponding to the identifier onto the streamer video image according to a position of the moving target in the streamer video image, so that the virtual prop is rendered in the streamer video image, and a target video image combining the image of the virtual prop and the streamer video image is generated.

Optionally, a manner of superimposing an image of a virtual prop onto the streamer video image according to the position of the moving target in the streamer video image may be adjusted according to a type of the moving target and a type of the virtual prop. For example, in a streamer video image, if a streamer holds a pet, and the server recognizes that a type of a moving target is a pet and a type of a virtual prop is virtual pet food, the virtual pet food may be superimposed at a position of the pet in the streamer video image.

Step S33: Send the target video image to a viewer client.

Further, the server may alternatively send the target video image to the streamer client.

Further, the server may enable graphic processing unit (GPU) hardware acceleration: a server end may enable a GPU hardware acceleration function to improve a video image processing speed, reduce pressure on a central processing unit (CPU) during virtual prop rendering, and improve processing performance. In this embodiment of this application, a GPU of the server may mainly be responsible for performing step S31 and step S32. That is, the GPU may determine a position of the streamer portrait in the streamer video image based on the edge detection technology and motion detection technology while guaranteeing that the image of the virtual prop is aligned with the streamer video image during superimposition, and superimpose the image of the virtual prop onto the streamer video image according to the position of the streamer portrait in the streamer video image, to generate a target video image.

The foregoing text describes the content of implementing virtual prop allocation based on the geographic location of the streamer client and the geographic location for placement of each virtual prop, and the content of superimposing the image of the virtual prop onto the streamer video image based on the AR processing capability of the server. This embodiment of this application further provide a solution of performing virtual prop allocation when the streamer client does not enable a positioning service (for example, the streamer client does not authorize the server to obtain the geographic location identifier of the streamer client or global position service (GPS) is disabled or unavailable the steamer client).

Because the streamer client does not enable the positioning service, the virtual prop cannot be allocated based on a real geographic location of the streamer client. This embodiment of this application may provide a virtual prop allocation solution based on a camera direction of the streamer client. The streamer client may upload, as scheduled or in real time, an angle by which a camera currently deviates from a specified direction to the server. If the server determines that the angle by which the camera currently deviates from the specified direction falls within an angle range corresponding to virtual prop allocation, the server may allocate the virtual prop to the streamer client, and if the server determines that the angle by which the camera currently deviates from the specified direction does not fall within the angle range corresponding to the virtual prop allocation, the server may prompt the streamer client to correct a photographing direction of the camera until the angle by which the camera currently deviates from the specified direction falls within the angle range corresponding to the virtual prop allocation.

For example, it may be defined that a virtual prop is placed in the right north of the streamer, and then, it is determined that the streamer captures the virtual prop when the streamer directs the camera at the right north. Otherwise, the streamer may be prompted to correct a photographing direction of the camera until the camera is directed at the right north.

Figure 9:
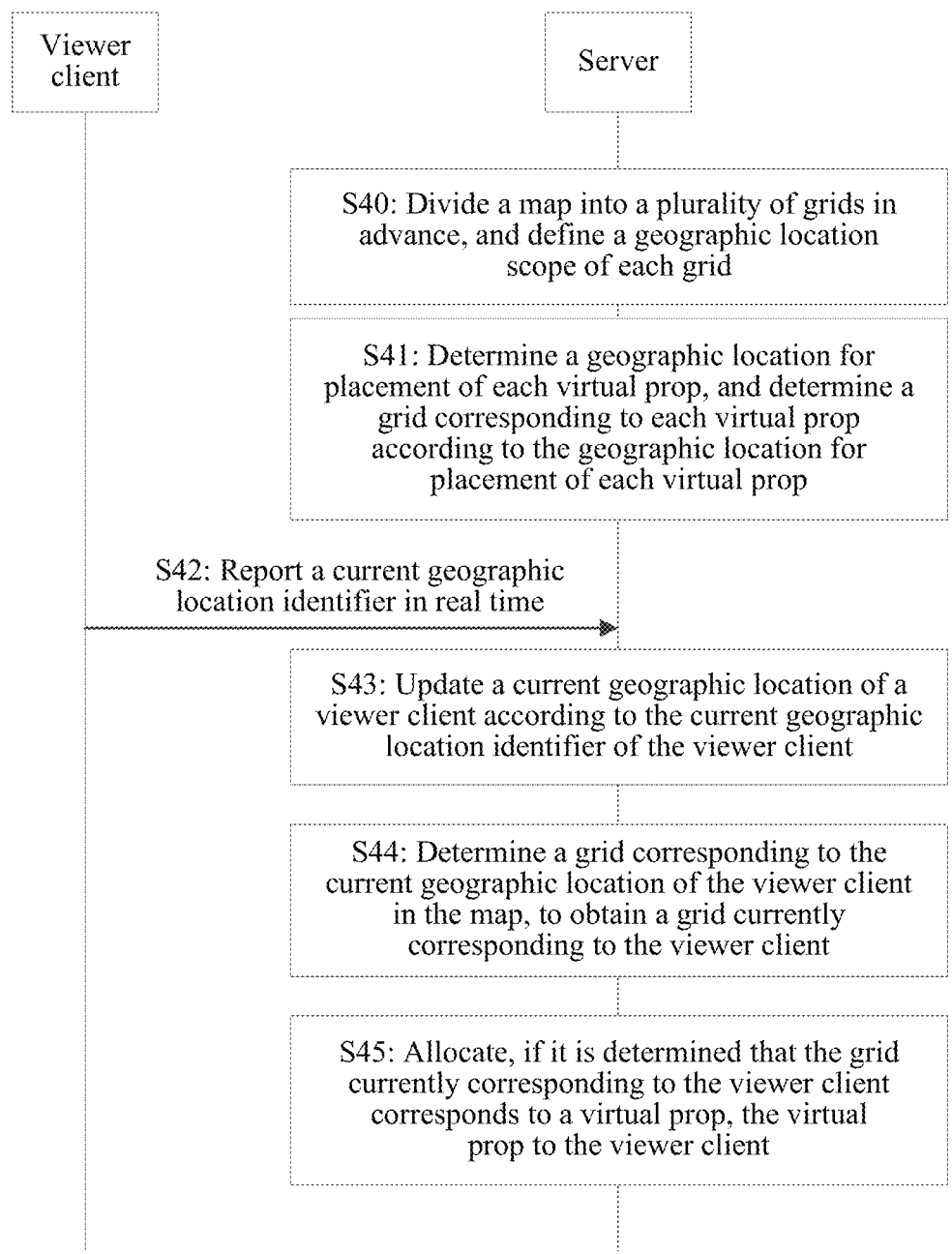
FIG. 9 is still another signaling flowchart of a virtual prop allocation method according to an embodiment of this application.

The virtual prop allocation method is described by using a case in which a virtual prop is allocated to a viewer. FIG. 9 shows still another signaling flowchart of an optional virtual prop allocation method. With reference to FIG. 1 and FIG. 9, the procedure may include the following steps.

Step S40: A server divides a map into a plurality of cells in advance, and defines a geographic location scope of each cell.

Optionally, for description on step S40, refer to step S10 shown in FIG. 2.

Step S41: The server determines a geographic location for placement of each virtual prop, and determines a cell corresponding to each virtual prop according to the geographic location for placement of each virtual prop.

Optionally, for description on step S41, refer to step S11 shown in FIG. 2.

It should be further supplemented that allocating a virtual prop to a viewer may be initiated by a streamer. The streamer may request the server for placing a virtual prop to a viewer currently viewing a live video. In this embodiment of this application, a target region in which a total quantity of viewers viewing the streamer reaches a specified quantity may be determined in regions of respective specified scopes, so as to determine that a region for placement of the virtual prop corresponds to the target region, and a randomly determined geographic location in the target region is used as a geographic location for placement of the virtual prop.

Step S42: A viewer client reports a current geographic location identifier of the viewer client to the server in real time.

Further, the server may send virtual prop placement prompt information to the viewer client, and the viewer client may send, in response to the virtual prop placement prompt information, request information for searching for the virtual prop to the server. The viewer client may enter, in response to the virtual prop placement prompt information, a virtual prop searching mode. A symbol of entering the virtual prop searching mode is that the viewer client needs to send the request information for searching for the virtual prop to the server, so as to trigger the server to perform a subsequent procedure.

In addition, the viewer client may report a current geographic location identifier to the server in real time, to facilitate the server of performing subsequent processing.

Step S43: The server updates the current geographic location of the viewer client according to the current geographic location identifier of the viewer client.

Optionally, step S42 to step S43 may be considered as an optional manner in which the server obtains the current geographic location of the viewer client.

Step S44: The server determines a cell corresponding to the current geographic location of the viewer client in the map, to obtain a cell currently corresponding to the viewer client.

Step S45: The server allocates, if determining that the cell currently corresponding to the viewer client corresponds to a virtual prop, the virtual prop to the viewer client.

Further, the server may send, to the streamer client, prompt information indicating that the virtual prop is allocated to the viewer client.

In view of the above, the procedure of allocating a virtual prop to a streamer shown in FIG. 2 is similar to the procedure of allocating a virtual prop to a viewer shown in FIG. 9. Both of the procedures are based on the LBS, and implement allocation of the virtual prop according to matching of a cell corresponding to a geographic location for placement of a virtual prop and a cell corresponding to a current geographic location of a client in a map. In addition, in a process of searching for a virtual prop, the streamer or viewer needs to make the cell corresponding to the client correspond to the cell corresponding to the virtual prop by changing a location, thereby improving sense of reality of experience of the streamer or viewer in a virtual prop allocation process.

Further, to enable the viewer client to find the virtual prop more conveniently, the server may determine a virtual prop nearest to the viewer client according to a geographic location for placement of each virtual prop and a current geographic location of the viewer client. The server may feed back the current geographic location of the viewer client and the geographic location for placement of the nearest virtual prop to the viewer client.

The viewer client may draw a radar map according to the current geographic location of the viewer client and the geographic location for placement of the nearest virtual prop. The radar map may be marked with a distance and a direction of the nearest virtual prop relative to the viewer client.

Optionally, the distance and the direction of the virtual prop nearest to the viewer client relative to the viewer client may be determined according to the current geographic location of the viewer client and the geographic location for placement of the nearest virtual prop.

Optionally, if allocating a virtual prop to a viewer is initiated by a streamer, after all virtual props are obtained by viewers (that is, all virtual props are allocated to viewer clients), the streamer client may trigger a specified event. For example, the streamer client may trigger a rewarding event of obtaining a special title and medal and the like.

Optionally, as described above, the placed virtual prop may have an effective placement time.

Optionally, in this embodiment of this application, a streamer portrait may be superimposed on a palm of a viewer image captured by a viewer client by using an AR processing capability, so that the streamer portrait may move on the palm of the viewer image, to enrich live streaming forms.

Figure 10:
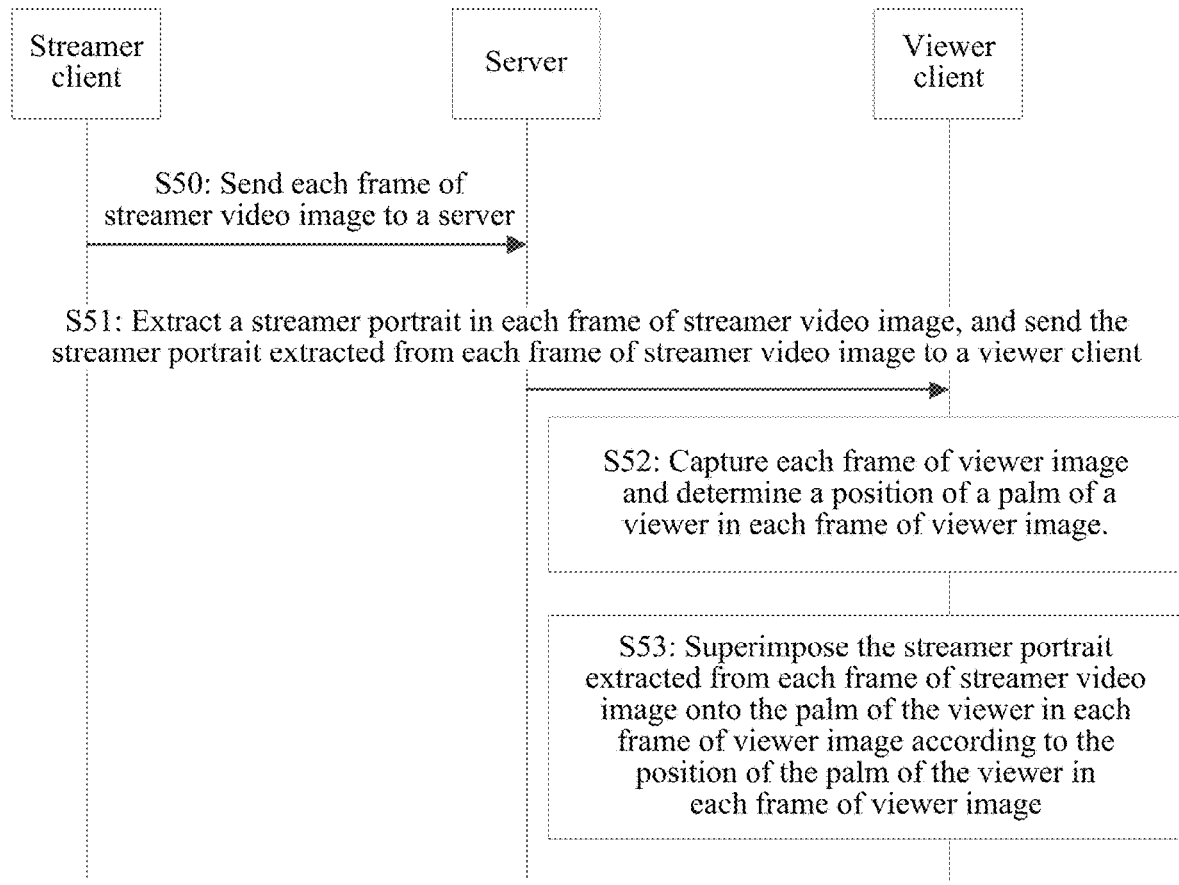
FIG. 10 is another signaling flowchart of live streaming according to an embodiment of this application.

Optionally, FIG. 10 shows another signaling procedure of live streaming according to an embodiment of this application. Referring to FIG. 10, the procedure may include the following steps.

Step S50: A streamer client sends each frame of streamer video image to a server.

Step S51: The server extracts a streamer portrait in each frame of streamer video image, and sends the streamer portrait extracted from each frame of streamer video image to a viewer client.

Optionally, the server may perform step S51 only when receiving a viewing mode switching instruction sent by a viewer client. That is, only when receiving the viewing mode switching instruction sent by the viewer client, the server extracts a streamer portrait in each frame of streamer video image, and sends the streamer portrait extracted from each frame of streamer video image to the viewer client. Otherwise, the server sends each frame of streamer video image or each frame of streamer video image superimposed with the virtual prop to the viewer client.

In this embodiment of this application, at least two viewing modes may be set. For example, a first viewing mode and a second viewing mode are set. In the first viewing mode, a viewer client may view, with a screen, a streamer video image or a streamer video image superimposed with a virtual prop broadcast by the server. In the second viewing mode, a viewer client may start a camera to capture a viewer image and superimpose a streamer portrait on a palm of the viewer image.

Optionally, the foregoing viewing mode switching instruction may be an instruction of switching to the second viewing mode. When the viewer client switches to the second viewing mode, a corresponding viewing mode switching instruction may be sent to the server, and after receiving the viewing mode switching instruction, the server may extract a streamer portrait from the received streamer video image, so as to subsequently superimpose the streamer portrait onto the palm of the viewer image for presentation.

Optionally, in this embodiment of this application, the streamer portrait may be extracted from the streamer video image by using a green screen technology. The streamer may perform live streaming in a green screen background, so that the streamer client may capture each frame of streamer video image with the green screen background. After receiving each frame of streamer video image with the green screen background, the server may separate the green screen background and the streamer portrait in each frame of streamer video image, thereby extracting the streamer portrait in each frame of streamer video image.

Step S52: The viewer client captures each frame of viewer image and determines a position of a palm of a viewer in each frame of viewer image.

Optionally, in this embodiment of this application, the viewer client may determine, with reference to the edge detection technology and the motion detection technology, a position of a palm of the viewer in each frame of viewer image, so that the streamer portrait and the palm may be kept aligned when the streamer portrait is superimposed on the palm in each frame of viewer image.

In this embodiment of this application, the viewer client may perform edge detection on a viewer portrait in each frame of viewer image according to the edge detection technology, and process each frame of viewer image according to the motion detection technology, to determine a body position of the viewer portrait in each frame of viewer image, so as to determine a position of the palm of the viewer in each frame viewer image with reference to the edge position and the body position of the viewer portrait in each frame of viewer image.

Step S53: The viewer client superimposes the streamer portrait extracted from each frame of streamer video image onto the palm of the viewer in each frame of viewer image according to the position of the palm of the viewer in each frame of viewer image.

Optionally, if the streamer client captures a streamer video image by using an AR camera, an extracted streamer portrait may be considered to be in a 3D form, and the streamer portrait in a 3D form may be superimposed on the palm of the viewer in the viewer image.

If the streamer client captures a streamer video image by using a built-in camera of a mobile phone or the like, an extracted streamer portrait may be considered to be in a 2D planar form, and the streamer portrait superimposed on the palm of the viewer in the viewer image may be in a 2D form. Further, the viewer client may preset a 3D portrait model. After a streamer portrait in a 2D form is combined with the 3D portrait model, a streamer portrait in a 3D form may be obtained, so that the streamer portrait in a 3D form may be superimposed on the palm of the viewer in each frame of viewer image.

Figure 11:
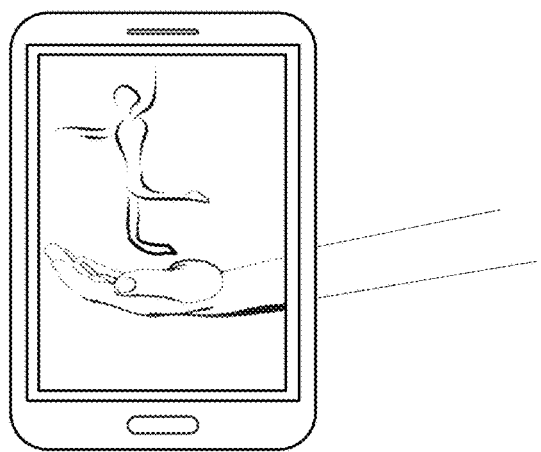
FIG. 11 is a schematic diagram of superimposing a streamer portrait on a palm of a viewer in a viewer image.

FIG. 11 shows a schematic diagram of superimposing a streamer portrait on a palm of a viewer in a viewer image, and FIG. 11 may be referred to.

In the method shown in FIG. 10, the streamer portrait extracted from each frame of streamer video image is superimposed onto the palm of the viewer in each frame of viewer image, so that the streamer portrait superimposed onto the palm of the viewer in viewer image may be synchronized with an actual action of the streamer, thereby improving sense of reality of the streamer portrait superimposed on the palm of the viewer in the viewer image.

Optionally, as an alternative method of the method shown in FIG. 10, the server may alternatively extract a streamer portrait from a first frame of streamer video image or a plurality of frames of streamer video images including the first frame of streamer video image, the extracted streamer portrait may be sent to the viewer client, and the streamer portrait may be superimposed by the viewer client onto the palm of the viewer in the viewer image. Subsequently, the server does not need to extract a streamer portrait from each frame of streamer video image. Instead, the server may analyze an action of a streamer portrait in each frame of streamer video image, to generate a streamer portrait action instruction corresponding to each frame of streamer video image, and the server sends the streamer portrait action instruction corresponding to each frame of streamer video image to the viewer client. Therefore, viewer client may control, according to the streamer portrait action instruction corresponding to each frame of streamer video image, an action of the streamer portrait superimposed on the palm of the viewer in the viewer image, to synchronize the action of the streamer portrait superimposed on the palm of the viewer in the viewer image with a real action of the streamer, thereby improving sense of reality of the streamer portrait superimposed on the palm of the viewer in the viewer image.

In the virtual prop allocation method provided in this embodiment of this application, virtual prop allocation may be implemented based on matching between a cell corresponding to a geographic location for placement of virtual prop in a map and a cell corresponding to a current geographic location of the client in the map, thereby enriching virtual prop allocation manners. In addition, in a process of searching for a virtual prop, the client needs to make the cell corresponding to the client correspond to the cell corresponding to the virtual prop by changing a location, thereby improving sense of reality of experience in a virtual prop allocation process.

In this embodiment of this application, the virtual prop may be superimposed onto the streamer video image alternatively based on the AR technology, thereby improving vividness of the streamer video image. In addition, the streamer portrait may be superimposed onto the palm in the viewer image captured by the viewer client, and synchronization of actions of the streamer portrait is kept, thereby enriching live streaming forms.

A server provided in this embodiment of this application is described below. The content of the server described below may be considered as logical components that need to be set by the server for implementing the virtual prop allocation method provided by the embodiments of this application. Mutual reference may be made between the content of the server described below and the content of the virtual prop allocation method described above.

Figure 12:
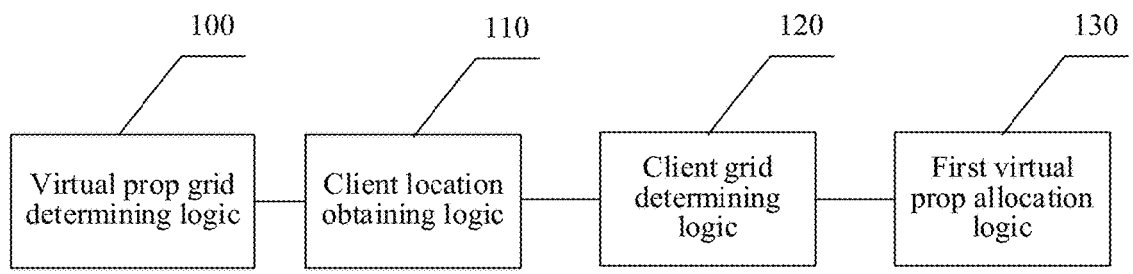
FIG. 12 is a structural block diagram of a logical component of a server according to an embodiment of this application.

FIG. 12 is a structural block diagram of a logical component of a server according to an embodiment of this application. Referring to FIG. 12, the server may include:

a virtual prop cell determining logic 100, configured to determine a geographic location for placement of each virtual prop, and determine a cell corresponding to each virtual prop in a map according to the geographic location for placement of each virtual prop, the map being divided into a plurality of cells in advance, and each cell being defined with a corresponding geographic location scope;

a client location obtaining logic 110, configured to obtain a current geographic location of a client;

a client cell determining logic 120, configured to determine a cell corresponding to the current geographic location of the client in the map, to obtain a cell currently corresponding to the client; and a first virtual prop allocation logic 130, configured to allocate, when the cell currently corresponding to the client corresponds to a virtual prop, the virtual prop to the client.

Figure 13:
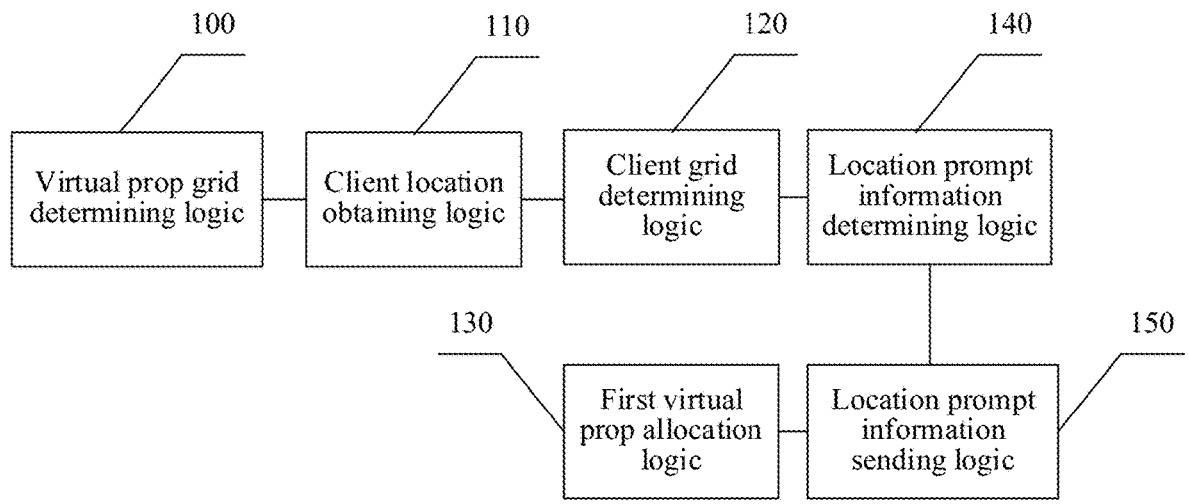
FIG. 13 is another structural block diagram of a logical component of a server according to an embodiment of this application.

Optionally, if the client is a streamer client. FIG. 13 shows another structural block diagram of a logical component of a server. With reference to FIG. 12 and FIG. 13, the server may further include:

a location prompt information determining logic 140, configured to determine location prompt information of each virtual prop relative to the client according to the cell currently corresponding to the client and a cell corresponding to each virtual prop; and a location prompt information sending logic 150, configured to send the location prompt information sending to the client.

Optionally, the location prompt information determining logic 140 being configured to determine location prompt information of each virtual prop relative to the client according to the cell currently corresponding to the client and a cell corresponding to each virtual prop specifically includes:

determining, according to the cell currently corresponding to the client and the cell corresponding to each virtual prop, distribution information of the cell corresponding to each virtual prop relative to the cell currently corresponding to the client.

Optionally, the location prompt information determining logic 140 being configured to determine, according to the cell currently corresponding to the client and the cell corresponding to each virtual prop, distribution information of the cell corresponding to each virtual prop relative to the cell currently corresponding to the client specifically includes:

gradually enlarging a traversing scope of cells by using the cell currently corresponding to the client in the map as a center until cells of a specified scope are all traversed, and marking the traversed cells each corresponding to a virtual prop, to determine the distribution information.

Figure 14:
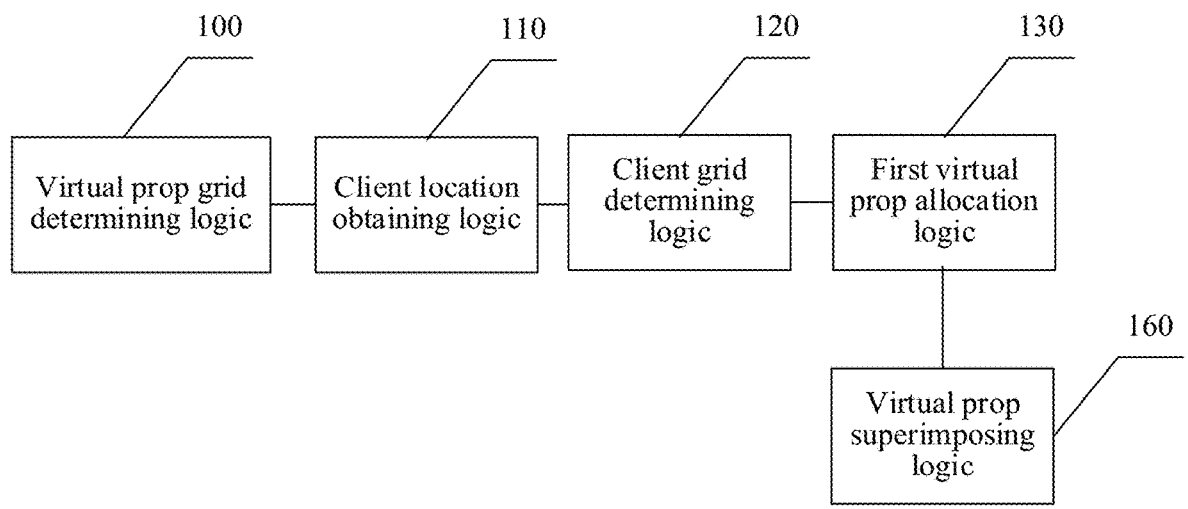
FIG. 14 is still another structural block diagram of a logical component of a server according to an embodiment of this application.

Optionally, if the client is a streamer client. FIG. 14 shows still another structural block diagram of a logical component of a server. With reference to FIG. 12 and FIG. 14, the server may further include:

a virtual prop superimposing logic 160, configured to: obtain a streamer video image sent by the client, and determine an identifier of a to-be-combined virtual prop that is indicated by the client; determine a position of a streamer portrait in the streamer video image; superimpose an image of a virtual prop corresponding to the identifier onto the streamer video image according to the position of the streamer portrait in the streamer video image, to generate a target video image; and send the target video image to a viewer client.

Optionally, the virtual prop superimposing logic 160 being configured to determine a position of a streamer portrait in the streamer video image specifically includes:

performing edge detection on a streamer portrait in each frame of streamer video image according to an edge detection technology, to obtain an edge position of the streamer portrait in each frame of streamer video image; and processing each frame of streamer video image according to a motion detection technology, to determine a body position of the streamer portrait in each frame of streamer video image; and determining a position of the streamer portrait in each frame of streamer video image with reference to the edge position and the body position of the streamer portrait in each frame of streamer video image.

Optionally, the virtual prop superimposing logic 160 being configured to superimpose an image of a virtual prop corresponding to the identifier onto the streamer video image according to the position of the streamer portrait in the streamer video image, to generate a target video image specifically includes:

superimposing, if the virtual prop is a wearable virtual prop, the image of the virtual prop onto a position of a target part of the streamer portrait in each frame of streamer video image, the target part being a specified part for wearing a virtual prop; or determining, if the virtual prop is a virtual background, a background position in each frame of streamer video image according to a position of the streamer portrait in each frame of streamer video image, and superimposing the virtual prop at the background position in each frame of streamer video image.

Figure 15:
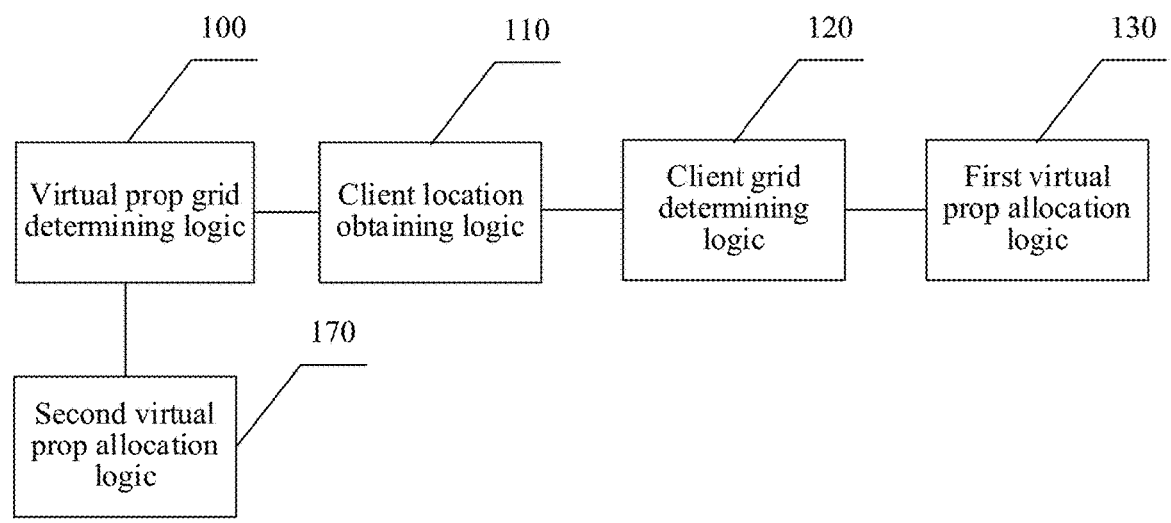
FIG. 15 is yet another structural block diagram of a logical component of a server according to an embodiment of this application.

Optionally, if the client is a streamer client. FIG. 15 shows yet another structural block diagram of a logical component of a server. With reference to FIG. 12 and FIG. 15, the server may further include:

a second virtual prop allocation logic 170, configured to determine whether an angle by which a camera of the client currently deviates from a specified direction falls within an angle range corresponding to virtual prop allocation when the client does not enable a positioning service; allocate a virtual prop to a streamer client if the angle by which the camera currently deviates from the specified direction falls within the angle range corresponding to the virtual prop allocation; and prompt, if the angle by which the camera currently deviates from the specified direction does not falls within the angle range corresponding to the virtual prop allocation, the client to correct a photographing direction of the camera until the angle by which the camera currently deviates from the specified direction falls within the angle range corresponding to the virtual prop allocation.

Figure 16:
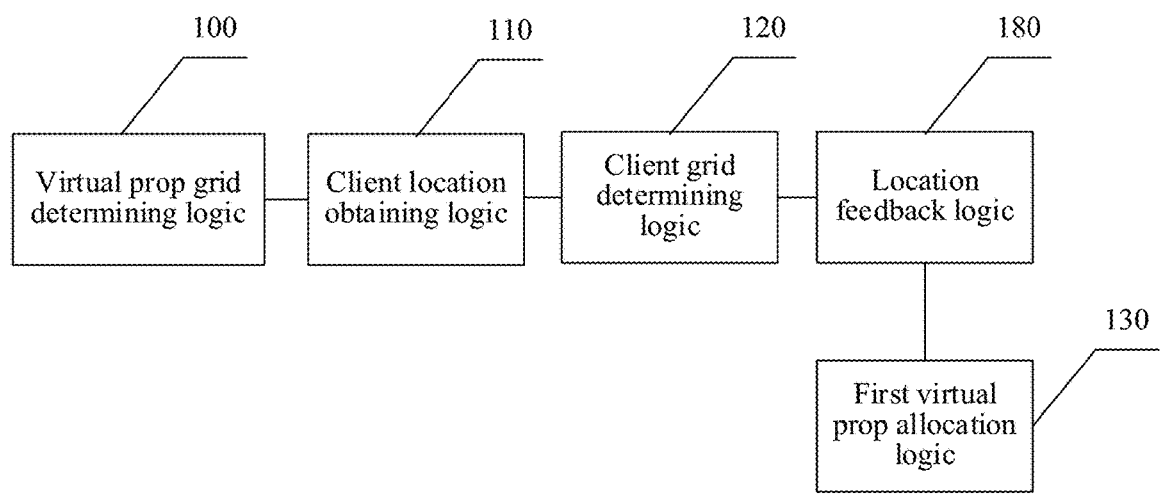
FIG. 16 is still yet another structural block diagram of a logical component of a server according to an embodiment of this application.

Optionally, if the client is a viewer client. FIG. 16 shows a still yet another structural block diagram of a logical component of a server according to an embodiment of this application. With reference to FIG. 12 and FIG. 16, the server may further include:

a location feedback logic 180, configured to feed back the current geographic location of the client and a geographic location for placement of a nearest virtual prop to the client, so that the client draws a radar map according to the current geographic location of the client and the geographic location for placement of the nearest virtual prop, where the radar map is marked with a distance and a direction of the nearest virtual prop relative to the client.

Figure 17:
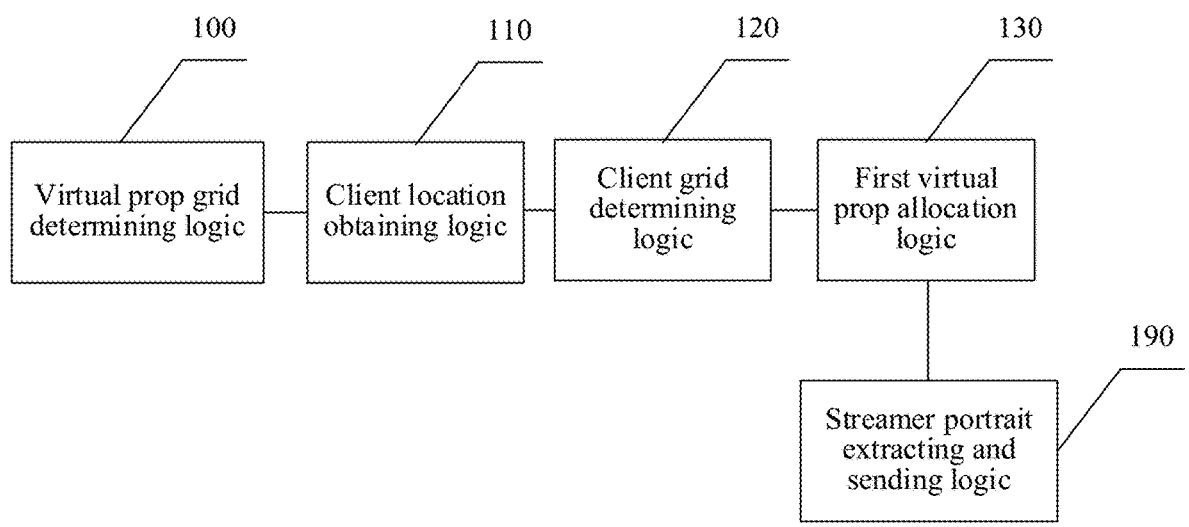
FIG. 17 is a further structural block diagram of a logical component of a server according to an embodiment of this application.

Optionally, if the client is a viewer client. FIG. 17 shows a further structural block diagram of a logical component of a server according to an embodiment of this application. With reference to FIG. 12 and FIG. 17, the server may further include:

a streamer portrait extracting and sending logic 190, configured to obtain each frame of streamer video image to extract a streamer portrait in each frame of streamer video image, and send the streamer portrait extracted from each frame of streamer video image to the viewer client, so that the viewer client superimposes the streamer portrait extracted from each frame of streamer video image to a palm of a viewer in each captured frame of viewer image.

Optionally, if the client is a viewer client, functions of the streamer portrait extracting and sending logic 190 of the server shown in FIG. 17 may alternatively replaced with the following functions: extracting a streamer portrait from a first frame of streamer video image or a plurality of frames of streamer video images including the first frame of streamer video image, and sending the extracted streamer portrait to the viewer client, so that the streamer portrait may be superimposed by the viewer client onto the palm of the viewer in the viewer image; and analyzing an action of a streamer portrait in each frame of streamer video image, to generate a streamer portrait action instruction corresponding to each frame of streamer video image, and sending the streamer portrait action instruction corresponding to each frame of streamer video image to the viewer client, so that the viewer client controls, according to the streamer portrait action instruction corresponding to each frame of streamer video image, an action of the streamer portrait superimposed on the palm of the viewer in the viewer image.

Optionally, the virtual prop cell determining logic 100 being configured to determine a geographic location for placement of each virtual prop may specifically include:

obtaining a virtual prop placement request sent by a viewer client, where the virtual prop placement request indicates a to-be-placed virtual prop and a geographic location for placement; and determining the geographic location for placement of the to-be-placed virtual prop according to the virtual prop placement request.

Optionally, the server may be further configured to: determine an effective placement time of each virtual prop; and cancel, if there is a virtual prop whose elapsed time for placement reaches an effective placement time, and has not been allocated to a client, a relationship between the virtual prop and a corresponding cell.

This embodiment of this application further provides a client. The client described below may be considered as logical components that need to be set by the client for implementing the virtual prop allocation method provided by the embodiments of this application. Mutual reference may be made between the content of the client described below and the content of the virtual prop allocation method described above.

Figure 18:
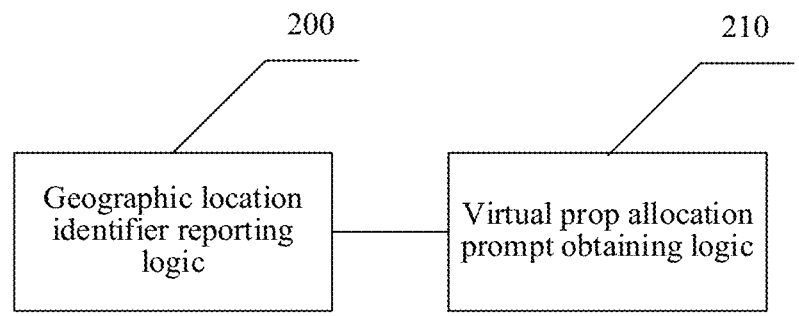
FIG. 18 is a structural block diagram of a logical component of a client according to an embodiment of this application.

FIG. 18 is a structural block diagram of a logical component of a client according to an embodiment of this application. Referring to FIG. 18, the client may include:

a geographic location identifier reporting logic 200, configured to report a current geographic location identifier to a server, the geographic location identifier corresponding to a current geographic location of a client; and a virtual prop allocation prompt obtaining logic 210, configured to obtain, when the server determines that there is a virtual prop corresponding to a cell corresponding to the current geographic location of the client in a map, prompt information that is sent by the server and that indicates that the virtual prop is allocated to the client, the map being divided into a plurality of cells in advance, each cell being defined with a corresponding geographic location scope, and a geographic location for placement of each virtual prop having a corresponding cell in the map.

Optionally, if the client is a streamer client, the client may be further configured to: receive location prompt information of each virtual prop relative to the client sent by the server, where the location prompt information is determined by the server according to a cell currently corresponding to the client and a cell corresponding to each virtual prop.

Optionally, if the client is a viewer client, the client may be further configured to: receive the current geographic location of the client and a geographic location for placement of a nearest virtual prop that are sent by the server, and draw a radar map according to the current geographic location of the client and the geographic location for placement of the nearest virtual prop, where the radar map is marked with a distance and a direction of the nearest virtual prop relative to the client.

Optionally, if the client is a streamer client, the client may be further configured to: send a streamer video image to the server and indicate an identifier of a to-be-combined virtual prop; and obtain a target video image sent by the server in which a virtual prop corresponding to the identifier is superimposed onto the streamer video image.

Optionally, if the client is a streamer client, the client may be further configured to: obtain the prompt information that is sent by the server and that indicates that the virtual prop is allocated to the client if an angle by which a camera currently deviates from a specified direction falls within an angle range corresponding to virtual prop allocation when the client does not enable a positioning service; and obtain information that is sent by the serer and that prompts correcting a photographing direction of the camera until the angle if which the camera currently deviates from the specified direction does not fall within the angle range corresponding to the virtual prop allocation.

Optionally, if the client is a viewer client, the client may be further configured to: obtain a streamer portrait that is extracted from each frame of streamer video image and that is sent by the server; capture each frame of viewer image and determining a position of a palm of a viewer in each frame of viewer image; and superimpose the streamer portrait extracted from each frame of streamer video image onto the palm of the viewer in each frame of viewer image according to the position of the palm of the viewer in each frame of viewer image.

Optionally, if the client is a viewer client, the client may be further configured to: obtain a streamer portrait extracted by the server from a first frame of streamer video image or a plurality of frames of streamer video images including the first frame of streamer video image, and superimpose the streamer portrait onto the palm of the viewer in the viewer image; obtain a streamer portrait action instruction corresponding to each frame of streamer video image sent by the server, and control, according to the streamer portrait action instruction corresponding to each frame of streamer video image, an action of the streamer portrait superimposed on the palm of the viewer in the viewer image.

Figure 19:
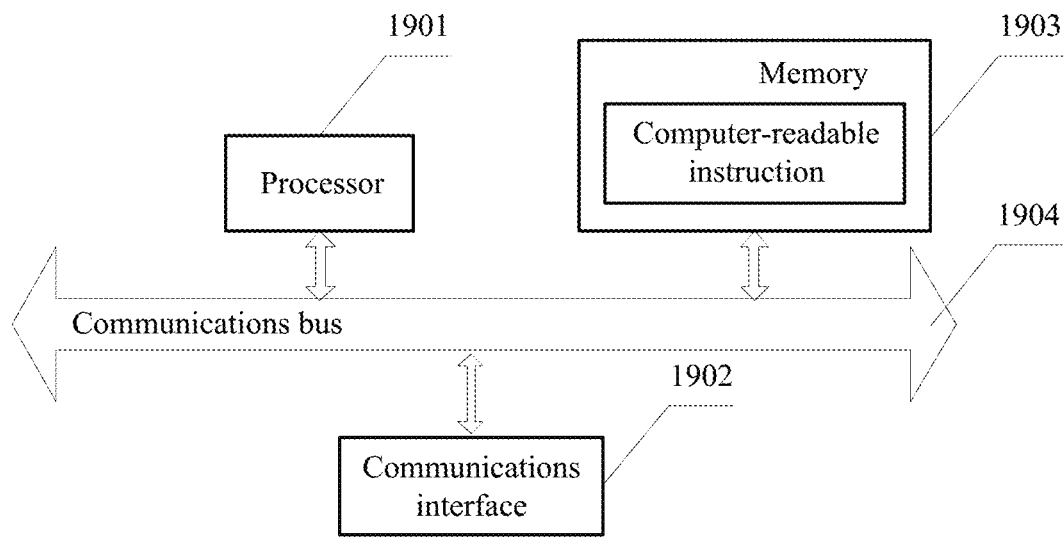
FIG. 19 is a block diagram of a hardware structure of a server according to an embodiment of this application.

FIG. 19 shows a hardware structure of a server. Referring to FIG. 19, the hardware structure of the server may include: at least one processor 1901, at least one communications interface 1902, at least one memory 1903, and at least one communications bus 1904.

In this embodiment of this application, a quantity of each of the processor 1901, the communications interface 1902, the memory 1903, and the communications bus 19044 is at least one, and communication among the processor 1901, the communications interface 1902, and the memory 1903 is implemented by using the communications bus 1904.

Optionally, the communication interface 1902 may be an interface of a communication logic, for example, an interface of a GSM logic.

The processor 1901 may be a Central Processing Unit (CPU) or an Application Specific Integrated Circuit (ASIC) or may be configured as one or more integrated circuits for implementing the embodiments of the present application.

The memory 1903 may include a high-speed RAM memory, or may include a non-volatile memory (non-volatile memory), for example, at least one magnetic disk storage.

The memory 1903 stores computer-readable instructions, and when the processor 1901 executes the computer-readable instructions stored by the memory 1903, the processor 1903 is caused to perform the following steps:

determining a geographic location for placement of each virtual prop, and determining a cell corresponding to each virtual prop in a map according to the geographic location for placement of each virtual prop, the map being divided into a plurality of cells in advance, and each cell being defined with a corresponding geographic location scope;

obtaining a current geographic location of a client;

determining a cell corresponding to the current geographic location of the client in the map, to obtain a cell currently corresponding to the client; and allocating, when the cell currently corresponding to the client corresponds to a virtual prop, the virtual prop to the client.

Optionally, for subdivided functions and extended functions of the program, refer to the description in the content corresponding to the server above.

Figure 20:
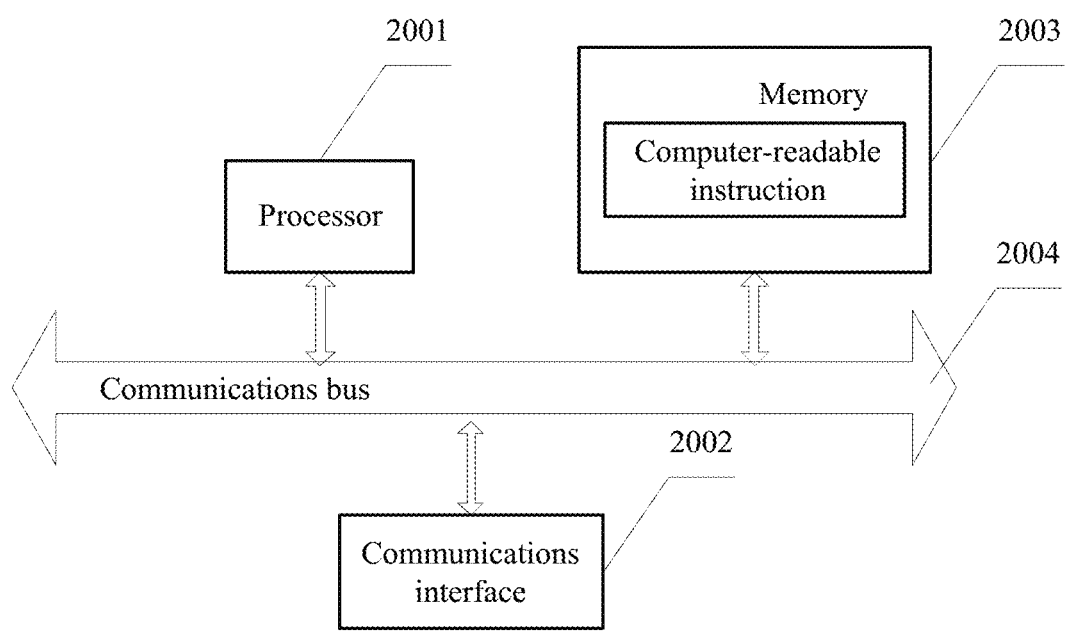
FIG. 20 is a block diagram of a hardware structure of a client according to an embodiment of this application.

FIG. 20 shows a hardware structure of a client. Referring to FIG. 20, the hardware structure of the client may include: at least one processor 2001, at least one communications interface 2002, at least one memory 2003, and at least one communications bus 2004.

In this embodiment of this application, a quantity of each of the processor 2001, the communications interface 2002, the memory 2003, and the communications bus 2004 is at least one, and communication among the processor 2001, the communications interface 2002, and the memory 2003 is implemented by using the communications bus 2004.

Optionally, the communication interface 2002 may be an interface of a communication logic, for example, an interface of a GSM logic.

The processor 2001 may be a Central Processing Unit (CPU) or an Application Specific Integrated Circuit (ASIC) or may be configured as one or more integrated circuits for implementing the embodiments of the present application.

The memory 2003 may include a high-speed RAM memory, or may include a non-volatile memory (non-volatile memory), for example, at least one magnetic disk storage.

The memory 2003 stores computer-readable instructions, and when the processor 2001 executes the computer-readable instructions stored by the memory 2003, the processor 2003 is caused to perform the following steps:

reporting a current geographic location identifier to a server, the geographic location identifier corresponding to a current geographic location of a client; and obtaining, when the server determines that there is a virtual prop corresponding to a cell corresponding to the current geographic location of the client in a map, prompt information that is sent by the server and that indicates that the virtual prop is allocated to the client, the map being divided into a plurality of cells in advance, each cell being defined with a corresponding geographic location scope, and a geographic location for placement of each virtual prop having a corresponding cell in the map.

It should be noted that the embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

In combination with the embodiments herein, steps of the method or algorithm described may be directly implemented using hardware, logic or instructions executed by a processor, or the combination thereof. The logic or instructions may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method comprising:
dividing, by a server, a map into a grid comprising a plurality of cells, each of the cells corresponding to different geographic areas represented on the map;
determining, by the server, geographic locations for a plurality of virtual props, respectively;
determining, by the server, the cells are associated with the virtual props based on the geographic locations for placement of the virtual props;
obtaining, by the server, a current geographic location of a client;
identifying, by the server, a cell of the grid corresponding to the current geographic location of the client;
determining, by the server, the identified cell is associated a virtual prop included in the virtual props;
allocating, by the server, in response to the identified cell being associated with the virtual prop, the virtual prop to the client;
determining, by the server, location prompt information for at least one of the virtual props proximate to the identified cell corresponding to the current geographic location of the client by: gradually traversing, by the server, the cells by starting with cells adjacent to the identified cell corresponding to the client until a traversing scope criteria is satisfied; and marking, by the server, the traversed cells in response to the traversed cells being mapped to at least one of the virtual props; and
sending, by the server, the location prompt information to the client.

2. The method of claim 1, further comprising:
obtaining, by the server, a streaming video sent by the client;
determining, by the server, an identifier of a target virtual prop that is indicated by the client;
determining, by the server, a position of a streamer portrait in the streaming video;
generating, by the server, a target image by superimposing an image of the target virtual prop corresponding to the identifier onto the streaming video based on the position of the streamer portrait in the streaming video; and
sending, by the server, the target image to a viewer client.

3. The method of claim 2, wherein the determining the position of the streamer portrait in the streaming video comprises:
detecting, by the server, an edge of the streamer portrait in a frame of the streaming video based on an edge detection technology;
obtain an edge position of the streamer portrait in a frame of the streaming video; determining, based on a motion detection technology, a body position of the streamer portrait in the frame of the streaming video; and
determining a position of the streamer portrait in the frame of the streaming video based on the edge position and the body position of the streamer portrait in each frame of streaming video image.

4. The method of claim 1, further comprising:
determining, by the server, in response to a positioning service being disabled, an angle a camera of the client relative to the virtual prop;
determining, by the server, whether the angle is within an angle range;
allocating, by the server, the virtual prop to a streamer client in response to the angle being in the angle range; and
prompting, by the server, in response to the angle not being in the angle range, the client to correct a direction of the camera until the angle is adjusted to be in the angle range.

5. The method of claim 1, further comprising:
transmitting, by the server, the current geographic location of the client and a geographic location the virtual prop to the client; and
causing, by the server, the client to draw a radar map according to the current geographic location of the client and the geographic location for the virtual prop, wherein the radar map is marked with a distance and a direction of the virtual prop relative to the client.

6. The method of claim 1, further comprising:
obtaining, by the server, a frame of streaming video;
extracting, by the server, a streamer portrait in the frame of streaming video;
sending, by the server, the streamer portrait extracted from the frame of streaming video to a viewer client; and
causing, by the server, the viewer client to superimpose the streamer portrait on an image of a palm of a viewer in captured frames of a viewer video.

7. The method of claim 1, wherein determining, by the server, the geographic locations for the plurality of virtual props, respectively, further comprises:
obtaining, by the server, a virtual prop placement request sent by a viewer client, wherein the virtual prop placement request indicates the virtual prop and a geographic location for placement; and
determining, by the server, the geographic location for the virtual prop according to the virtual prop placement request.

8. A method, comprising:
reporting, by a client, a geographic location identifier to a server, the geographic location identifier corresponding to a current geographic location of a client;
receiving, by the client, in response to determination, by the server, that a virtual prop is associated with a cell corresponding to the current geographic location of the client in a map, prompt information indicative of the virtual prop being allocated to the client, wherein the map is divided into a grid comprising a plurality of cells, each of the cells being associated with corresponding geographic area and a geographic location for placement of at least one of a plurality of virtual props;
obtaining, by the client, a streamer portrait extracted from a frame of streaming video; capturing, by the client, a frame of viewer video;
determining, by the client, a position of a palm of a viewer in a frame of the viewer video; and superimposing, by the client, the streamer portrait onto the palm of the viewer in each frame of viewer image based on the position of the palm of the viewer in the frame of the viewer video.

9. The method of claim 8, further comprising:
receiving, by the client, location prompt information for the virtual prop in response to the client being in proximity to the virtual prop, wherein the location prompt information is determined by the server according to a first cell corresponding to the geographic location of the client and the a second cell corresponding to the geographic location of the virtual prop; or
receiving, by the client, the current geographic location of the client and a geographic location the virtual prop that are sent by the server, and drawing a radar map according to the current geographic location of the client and the geographic location for the virtual prop, wherein the radar map is marked with a distandce and a direction of the virtual prop relative to the client.

10. The method of claim 8, further comprising:
determining, by the client, a positioning service is disabled on the client;
obtaining, by the client, in response to the positioning service being disabled, the prompt information by the server, the prompt information indicative of the virtual prop being allocated to the client in response to an angle being within an angle range for virtual prop allocation; and
obtaining, by the client, prompt information that sent by the server, the prompt information comprising an instruction to adjust a photographing direction of a camera until the angle is within the angle range.

11. A server, comprising:
a memory and a processor, the memory storing computer-readable instructions, the computer-readable instructions executable by the processor to:
divide a map into a grid comprising a plurality of cells, each of the cells corresponding to different geographic areas represented on the map;
determine geographic locations for a plurality of virtual props, respectively;
determine the cells are associated with virtual props based on the geographic locations for placement of the virtual props;
obtain a current geographic location of a client;
identify a cell of the grid corresponding to the current geographic location of the client;
determine the identified cell is associated a virtual prop included in the virtual props;
allocate in response to the identified cell being associated with the virtual prop, the virtual prop to the client:
obtain a streaming video sent by the client;
determine an identifier of a target virtual prop that is indicated by the client;
determine a position of a streamer portrait in the streaming video;
generate a target image by superimposing an image of the target virtual prop corresponding to the identifier onto the streaming video based on the position of the streamer portrait in the streaming video; and
send, by the server, the target image to a viewer client.

12. The server according to claim 11, wherein the computer-readable instructions are further executable by the processor to:
determine location prompt information for at least one of the virtual props proximate to the identified cell corresponding to the current geographic location of the client; and send the location prompt information to the client.

13. The server according to claim 12, wherein to determine the location prompt information for the at least one of the virtual props proximate to the identified cell corresponding to the current geographic location of the client, the computer-readable instructions are further executable by the processor to:
gradually traverse cells by starting with cells adjacent to the identified cell corresponding to the client in the map as a center until a traversing scope criteria is satisfied; and
mark the traversed cells in response to the traversed cells being mapped to at least one of the virtual props.

14. The server according to claim 11, wherein the computer-readable instructions are further executable by the processor to:
determine, in response to a positioning service being disabled, an angle a camera of the client relative to the virtual prop;
determine whether the angle is within an angle range;
allocate the virtual prop to a streamer client in response to the angle being in the angle range; and
prompt, in response to the angle not being in the angle range, the client to correct a direction of the camera until the angle is adjusted to be in the angle range.

15. The server according to claim 11, wherein the computer-readable instructions are further executable by the processor to:
transmit the current geographic location of the client and a geographic location the virtual prop to the client; and
cause the client to draw a radar map according to the current geographic location of the client and the geographic location for the virtual prop, wherein the radar map is marked with a distance and a direction of the virtual prop relative to the client.

16. The server according to claim 11, wherein the computer-readable instructions are further executable by the processor to:
obtain a frame of streaming video;
extract a streamer portrait in the frame of streaming video;
send the streamer portrait extracted from the frame of streaming video to a viewer client; and
cause the viewer client to superimpose the streamer portrait on an image of a palm of a viewer in captured frames of a viewer video.

17. A method comprising:
dividing, by a server, a map into a grid comprising a plurality of cells, each of the cells corresponding to different geographic areas represented on the map;
determining, by the server, geographic locations for a plurality of virtual props, respectively;
determining, by the server, the cells are associated with the virtual props based on the geographic locations for placement of the virtual props;
obtaining, by the server, a current geographic location of a client;
identifying, by the server, a cell of the grid corresponding to the current geographic location of the client;
determining, by the server, the identified cell is associated a virtual prop included in the virtual props;
allocating, by the server, in response to the identified cell being associated with the virtual prop, the virtual prop to the client;

determining, by the server, in response to a positioning service being disabled, an angle a camera of the client relative to the virtual prop;

allocating, by the server, the virtual prop to a streamer client in response to the angle being in an angle range; and prompting, by the server, in response to the angle not being in the angle range, the client to correct a direction of the camera until the angle is adjusted to be in the angle range.

* * * * *